US008861796B1

(12) United States Patent
Neustel

(10) Patent No.: US 8,861,796 B1
(45) Date of Patent: Oct. 14, 2014

(54) PATENT ANALYZING SYSTEM

(76) Inventor: Michael S. Neustel, Fargo, ND (US)

( * ) Notice: Subject to any disclaimer, the term of this patent is extended or adjusted under 35 U.S.C. 154(b) by 0 days.

(21) Appl. No.: 13/445,109

(22) Filed: Apr. 12, 2012

Related U.S. Application Data

(63) Continuation of application No. 12/132,674, filed on Jun. 4, 2008, now Pat. No. 8,160,306.

(60) Provisional application No. 60/942,361, filed on Jun. 6, 2007.

(51) Int. Cl.
*G06K 9/00* (2006.01)

(52) U.S. Cl.
USPC .......................................................... 382/113

(58) Field of Classification Search
None
See application file for complete search history.

(56) References Cited

U.S. PATENT DOCUMENTS

| 5,754,840 | A | 5/1998 | Rivette et al. | |
|---|---|---|---|---|
| 6,014,663 | A | 1/2000 | Rivette et al. | |
| 6,038,561 | A | 3/2000 | Snyder et al. | |
| 6,793,429 | B2 | 9/2004 | Arrison | |
| 7,523,126 | B2 * | 4/2009 | Rivette et al. | 1/1 |
| 7,853,572 | B2 | 12/2010 | Lundberg et al. | |
| 7,890,851 | B1 | 2/2011 | Milton, Jr. | |
| 7,941,468 | B2 | 5/2011 | Zellner et al. | |
| 8,036,493 | B1 * | 10/2011 | Neustel | 382/297 |
| 8,160,306 | B1 * | 4/2012 | Neustel | 382/113 |
| 8,161,025 | B2 * | 4/2012 | Lundberg et al. | 707/706 |
| 8,213,748 | B2 * | 7/2012 | Kimura et al. | 382/302 |
| 8,412,659 | B2 * | 4/2013 | Avasarala et al. | 706/45 |
| 8,520,982 | B2 * | 8/2013 | Chan et al. | 382/305 |
| 8,744,135 | B2 * | 6/2014 | Roman | 382/113 |
| 2003/0026459 | A1 * | 2/2003 | Won et al. | 382/113 |
| 2005/0210009 | A1 * | 9/2005 | Tran | 707/3 |
| 2006/0155690 | A1 * | 7/2006 | Wen et al. | 707/3 |
| 2008/0115057 | A1 * | 5/2008 | Grandhi et al. | 715/272 |
| 2010/0125566 | A1 * | 5/2010 | Gibbs et al. | 707/722 |

OTHER PUBLICATIONS

East Manual 2.0 ,Prepared by USPTO, May 5, 2006.*
East Patent Introduction Keywords and quick guide, May 5, 2006.*
United States Patent and Trademark Office, Patent Full-Text and Full-Page Image Database, www.uspto.gov/patft/index.html, Jun. 3, 2008, 1 page.
Patentcafe, Advanced Technology Patent Search, Patent Analystic and Intellectual Property Management Solutions, www.patentcafe.com, Jun. 3, 2008, 1 page.
Neustel Software, Inc., PatentHunter, www.patenthunter.com, Jun. 3, 2008, 1 page.

* cited by examiner

*Primary Examiner* — Nancy Bitar
(74) *Attorney, Agent, or Firm* — Michael S. Neustel

(57) ABSTRACT

A patent analyzing system for efficiently reviewing and analyzing a patent document (e.g. patent application, published patent document or patent). The patent analyzing system includes identifying the element names within a patent document and modifying patent drawing sheets to include element names and figure descriptions.

20 Claims, 25 Drawing Sheets

```
PatentAnalyzer Trial Version (Project 5444333)                                    _ □ ×
File Settings Tools Help 5444333      ( ANALYZE )  ( STOP )    Prior Projects: [ Select Existing Project  ▽ ]
| Index of Elements | Specification | Claims | Images |

( PRINT )  ( OPEN IN WORD )

Index of Elements for U.S. Patent No. 5444333
```

| 1:     | First                 | 48:  | Inductor Circuit       |
|--------|-----------------------|------|------------------------|
| 1/2:   | Terminals             | 48:  | Inductor Arrangement   |
| 10:    | AC Power Source       | 48:  | Inductor               |
| 10:    | Power Supply          | 49:  | Secondary Winding      |
| 12:    | DC Converter          | 52:  | Transistor             |
| 12:    | AC-DC Unit            | 52:  | Switch Transistor      |
| 12:    | AC-DC Converter Circuit | 56: | Resistors             |
| 14:    | Half Bridge Inverter  | 62:  | Capacitor              |
| 14:    | DC-AC Circuit         | 62:  | Output Capacitor       |
| 14:    | AC Converter Circuit  | 62:  | Simply Place Capacitor |
| 16:    | Inductor              | 62:  | Storage Capacitor      |
| 18:    | Filaments             | 64:  | Controller             |
| 18:    | Second Filament       | 68:  | Resistor               |
| 18:    | Element               | 72:  | Capacitor              |
| 20:    | Tube                  | 78:  | Capacitor              |
| 20:    | Fluorescent Tube      | 82:  | Diode                  |
| 20:    | Fluorescent Light Tube | 86: | Capacitor              |
| 22:    | Capacitance           | 88:  | Capacitor              |
| 22:    | Capacitors            | 90:  | Resistor               |
| 22/24: | Capacitors            | 92:  | Diac                   |
| 24:    | Capacitor             | 94:  | Diode                  |
| 24:    | Capacitance           | 96:  | Power Transistors      |
| 26:    | Starter               | 98:  | Power Transistor       |
| 26:    | Starter Circuit       | 98:  | Transistor             |
| 28:    | Protection Fuse       | 100: | Zener Diodes           |
| 30:    | Capacitors            | 104: | Secondaries            |
| 32:    | Inductors             | 112: | Primary                |
| 36:    | Diode Bridge          | 114: | Capacitor              |
| 42:    | Resistor              | 116: | Thermistor             |
| 44:    | Capacitor             | 116: | PTC Thermistor         |
| 44:    | Supply Capacitor      | 118: | Resistors              |
| 44:    | Charge Capacitor      | 122: | Capacitor              |
| 46:    | Diode                 | 124: | Diac                   |
| 126:   | Triac                 |      |                        |

Developed in Cooperation with Neustel Law Offices, LTD
Analysis of Patent Number: 5444333 Complete

Index of Elements for U.S. Patent No. 6793429

| 10: | Outer Tube |
|---|---|
| 10: | Tubular Elongate Outer Body |
| 11: | Chalk |
| 12: | Chalk Holder |
| 14: | Ratchet Teeth |
| 16: | Ramps |
| 16: | Accepting Ramps |
| 18: | First Retaining Ridge |
| 18: | First Spring-Retaining Ridge |
| 20: | Second Retaining Ridge |
| 20: | Second Spring-Retaining Ridge |
| 22: | Resilient Element |
| 24: | Slots |
| 26: | Spring Fingers |
| 26: | Jaws |
| 26: | Fingers |
| 26: | Jaw Members |
| 28: | End |
| 28: | Platform |
| 30: | Notch |
| 32: | Child-Resistant Screw Cap |
| 34: | Pawls |
| 36: | Disc |
| 36: | Flexible Disk |
| 50: | Projection |
| 50: | Internal Projection |

FIG. 19

U.S. Patent    Sep. 21, 2004    Sheet 2 of 2    US 6,793,429 B2
FIG. 3 is a schematic perspective view of the inner, chalk holder portion of the device of the invention.
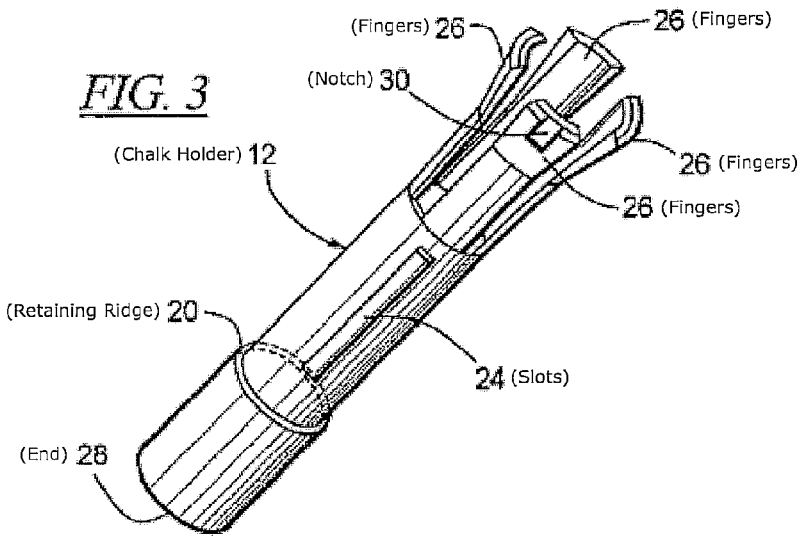
FIG. 4 is a cross-section of a child-resistant screw cap for use as a part of the device of the present invention.
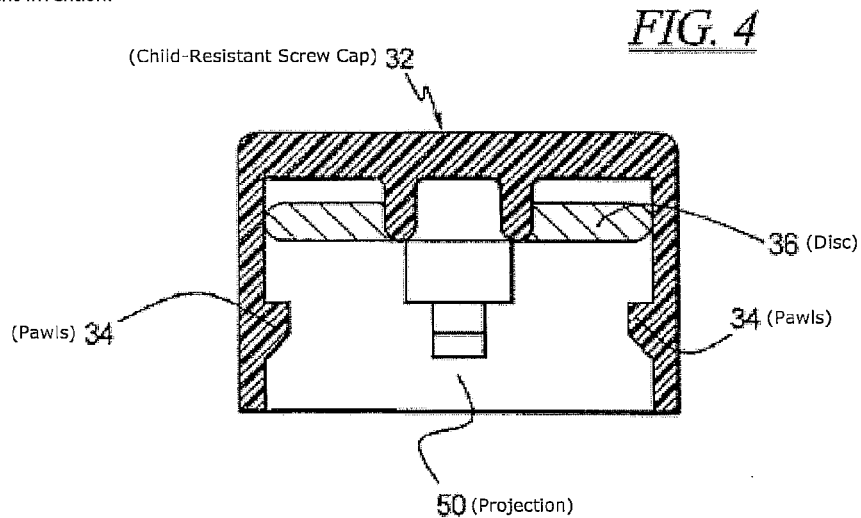
FIG. 20

FIG. 3 is a schematic perspective view of the inner, chalk holder portion of the device of the invention.

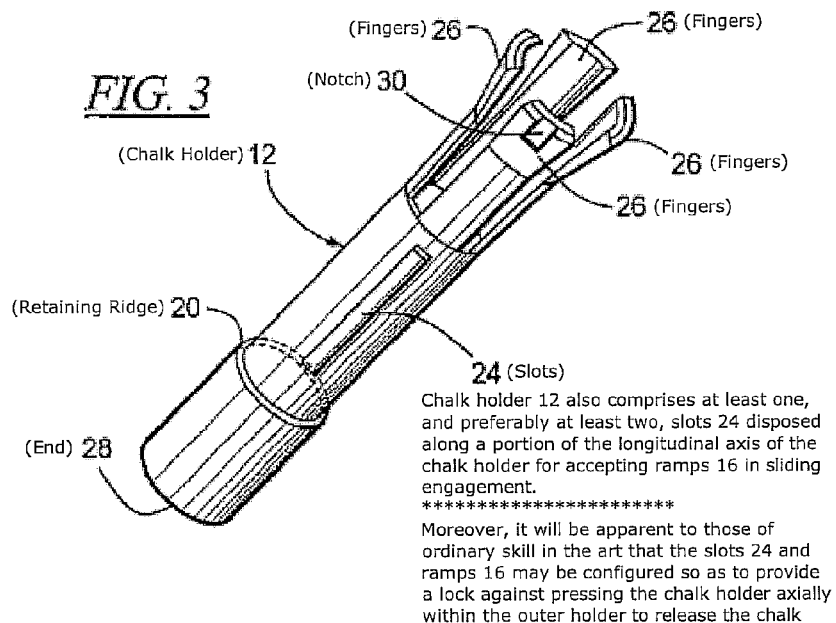

Chalk holder 12 also comprises at least one, and preferably at least two, slots 24 disposed along a portion of the longitudinal axis of the chalk holder for accepting ramps 16 in sliding engagement.
\*\*\*\*\*\*\*\*\*\*\*\*\*\*\*\*\*\*\*\*\*\*
Moreover, it will be apparent to those of ordinary skill in the art that the slots 24 and ramps 16 may be configured so as to provide a lock against pressing the chalk holder axially within the outer holder to release the chalk FIG. 4 is a cross-section of a child-resistant screw cap for use as a part of the device of the present invention.

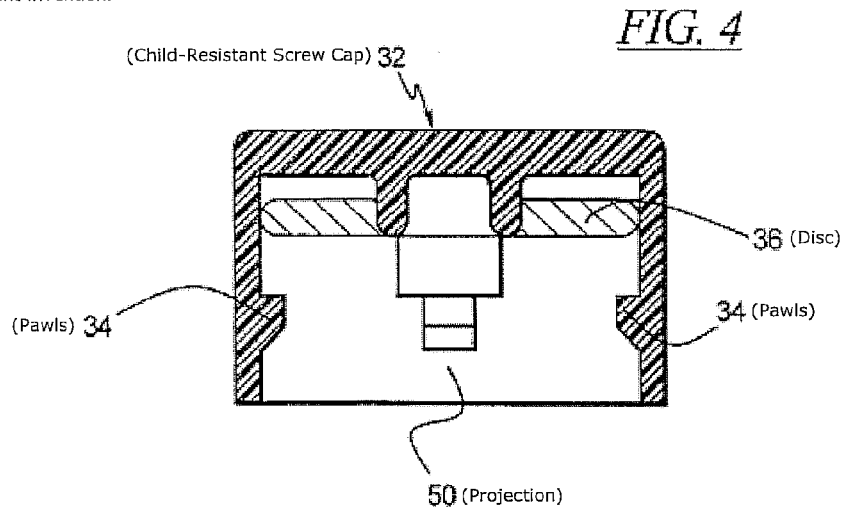

FIG. 21

PATENT ANALYZING SYSTEM

CROSS REFERENCE TO RELATED APPLICATIONS

I hereby claim benefit under Title 35, United States Code, Section 120 of U.S. patent application Ser. No. 12/132,674 filed Jun. 4, 2008. This application is a continuation of the Ser. No. 12/132,674 application. The Ser. No. 12/132,674 application is currently pending with an Issue Date of Apr. 17, 2012. The Ser. No. 12/132,674 application is hereby incorporated by reference into this application.

I hereby claim benefit under Title 35, United States Code, Section 119(e) of U.S. provisional patent application Ser. No. 60/942,361 filed Jun. 6, 2007. The 60/942,361 application. The 60/942,361 application is hereby incorporated by reference into this application. The Ser. No. 12/132,674 application claims priority to the 60/942,361 application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to patent management tools and more specifically it relates to a patent analyzing system for efficiently reviewing and analyzing a patent document (e.g. patent application, published patent document or patent).

2. Description of the Related Art

Any discussion of the prior art throughout the specification should in no way be considered as an admission that such prior art is widely known or forms part of common general knowledge in the field.

Conventional patent analysis software is currently used to analyze the content of large numbers of patents (referred to often times as "patent analytics"). In additional to patent analysis software available, software and websites are available that allow for the searching, downloading and viewing of patents (e.g. PATENTHUNTER, www.uspto.gov, www.ipsearchengine.com). While the previous patent analysis and patent searching software are good for the purpose they are intended, they are not focused upon the detailed analysis of the content for an individual patent.

BRIEF SUMMARY OF THE INVENTION

The present invention generally comprises identifying the element names within a patent document and modifying patent drawing sheets to include element names and figure descriptions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a patent analyzing system that will overcome the shortcomings of the prior art systems.

A second object is to provide a patent analyzing system for efficiently reviewing and analyzing a patent document (e.g. patent application, published patent document or patent).

Another object is to provide a patent analyzing system that reduces the amount of time required to review and analyze a patent document.

An additional object is to provide a patent analyzing system that reduces the amount of time required to review and analyze the written portion of a patent document.

A further object is to provide a patent analyzing system that reduces the amount of time required to review and analyze the claims portion of a patent document.

Another object is to provide a patent analyzing system that reduces the amount of time required to review and analyze the drawings of a patent document.

A further object is to provide a patent analyzing system that may be utilized to analyze various types of patent documents including but not limited to non-filed patent applications, filed patent applications, published patent applications, and granted patents.

A further object is to provide a patent analyzing system that is able to analyze various formats of patent data including but not limited to HTML, XML, text, TIFF and PDF.

Another object is to provide a patent analyzing system that analyzes the text and image portion of a patent document.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is an exemplary interface of the present invention illustrating an index of elements created for U.S. Pat. No. 5,444,333.

Figure 5:
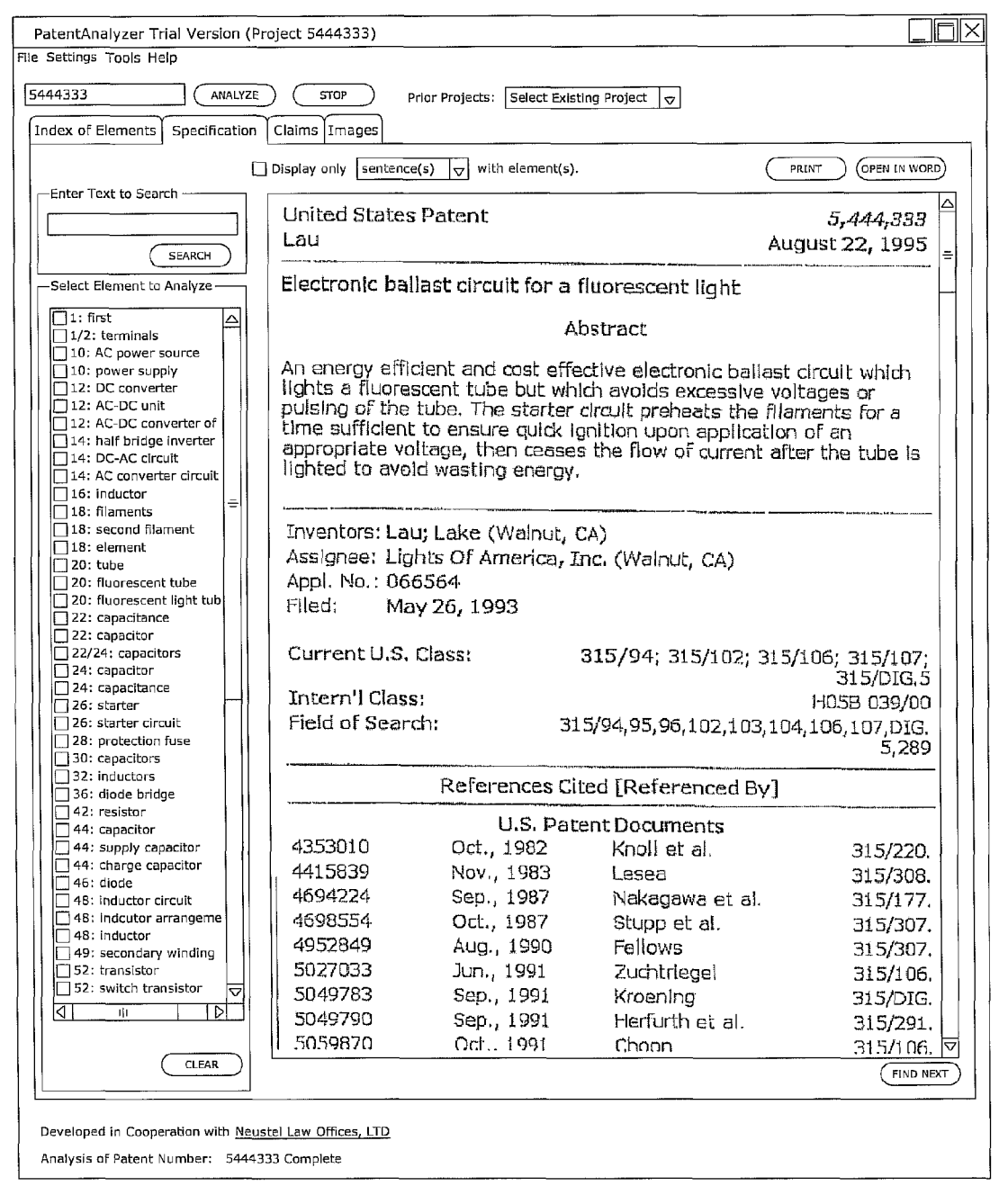

FIG. 5 is an exemplary interface of the present invention illustrating the display of the text portion of U.S. Pat. No. 5,444,333.

FIG. 6 is an exemplary interface of the present invention illustrating the highlighting of a selected element (inductor 16) within the text portion of U.S. Pat. No. 5,444,333.

FIG. 8 is an exemplary interface of the present invention illustrating the highlighting of a selected element (inductor 16) within the text portion of U.S. Pat. No. 5,444,333 and the displaying of only paragraphs containing the selected element.

FIG. 19 is an exemplary table illustrating the index of elements generated for U.S. Pat. No. 6,793,429.

FIG. 20 is an illustration of the element names and figure descriptions inserted into the image of the patent drawings of U.S. Pat. No. 6,793,429.

FIG. 21 is an illustration of the element names and figure descriptions inserted into the image of the patent drawings of U.S. Pat. No. 6,793,429 along with a pop-up text for element number 24 being selected showing the corresponding sentence text that contain the element number 24.

DETAILED DESCRIPTION OF THE INVENTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The present invention may be operated as a computer program installed upon a download computer 20, via a website or other system. It can be also appreciated that even though the description below is about downloading, searching and managing electronic patent files, the present invention may also be utilized for downloading, searching and managing electronic trademark files and other types of electronic data (e.g. HTML).

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

B. Exemplary Global Computer Network

Figure 1:
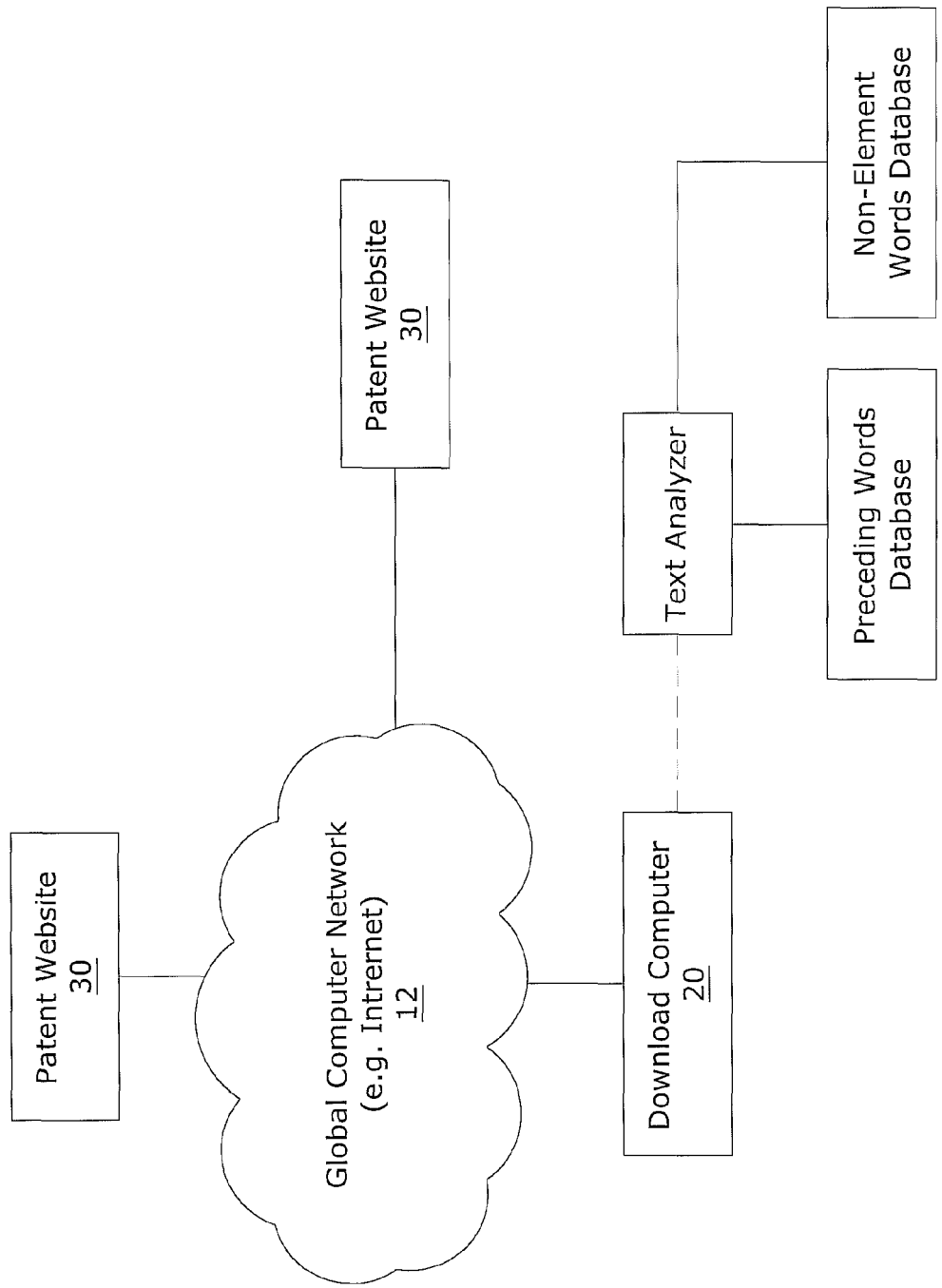
FIG. 1 is a block diagram of an exemplary computer network with a download computer and patent websites connected to the exemplary computer network.

As shown in FIG. 1, the global computer network (e.g. Internet) 12 is an exemplary communications network for the present invention. The Internet 12 is basically comprised of a "global computer network." A plurality of computer systems around the world are in communication with one another via this global computer network and are able to transmit various types of data between one another. The communications between the computer systems may be accomplished via various methods such as but not limited to wireless, Ethernet, cable, direct connection, telephone lines, and satellite. One or more web servers typically provide the data to the computer systems connected via the Internet 12.

The present invention may also be utilized upon global computer networks, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention preferably utilizes the Internet 12 for transmitting data, however it can be appreciated that as future technologies are created that various aspects of the invention may be practiced with these improved technologies.

The present invention is preferably embodied within a software application installed upon the download computer 20. However, the present invention may be embodied in various other manners such as but not limited to a central server computer or a web server that merely provide the results of the analyzed patent data.

C. Patent Documents

Patent documents may be comprised of various document including but not limited to non-filed patent applications, filed patent applications, published patent applications, granted patents, patent certificates and patent file wrappers. Downloading patent files (image and/or text) from patent websites 30 (e.g. www.uspto.gov, ep.espacenet.com/) via a global computer network 12 is well known in the art. The patent files may be comprised of issued patents, published applications or related patent data. Various software programs (e.g. PATENTHUNTER sold by Neustel Software, Inc.) and websites currently allow for the downloading of patent files from patent websites 30.

A "patent number" may be comprised of a United States or foreign patent number (typically with a patent code in front of it). For example, PCT published applications have the prefix "WO" and Japanese patents have the prefix "JP" before the patent number which are universally utilized to identify the patent document. A patent number may also be comprised of issued patents, published applications or other patent related data. With the present invention, if a letter prefix is not provided in the patent number, then the present invention assumes the patent number is a United States patent document thereby not requiring the user to enter "US" as a prefix.

The patent documents are in a computer readable file format and may be available direction from the computer 20 or via downloading through the global computer network 12. For example, a user may analyze the text of a MICROSOFT WORD document containing a patent application or an HTML file downloaded from the global computer network. Various other file formats may be analyzed with the present invention.

D. Text Analysis of Patent Documents

1. Downloading/Importing Patent Documents

Figure 2:
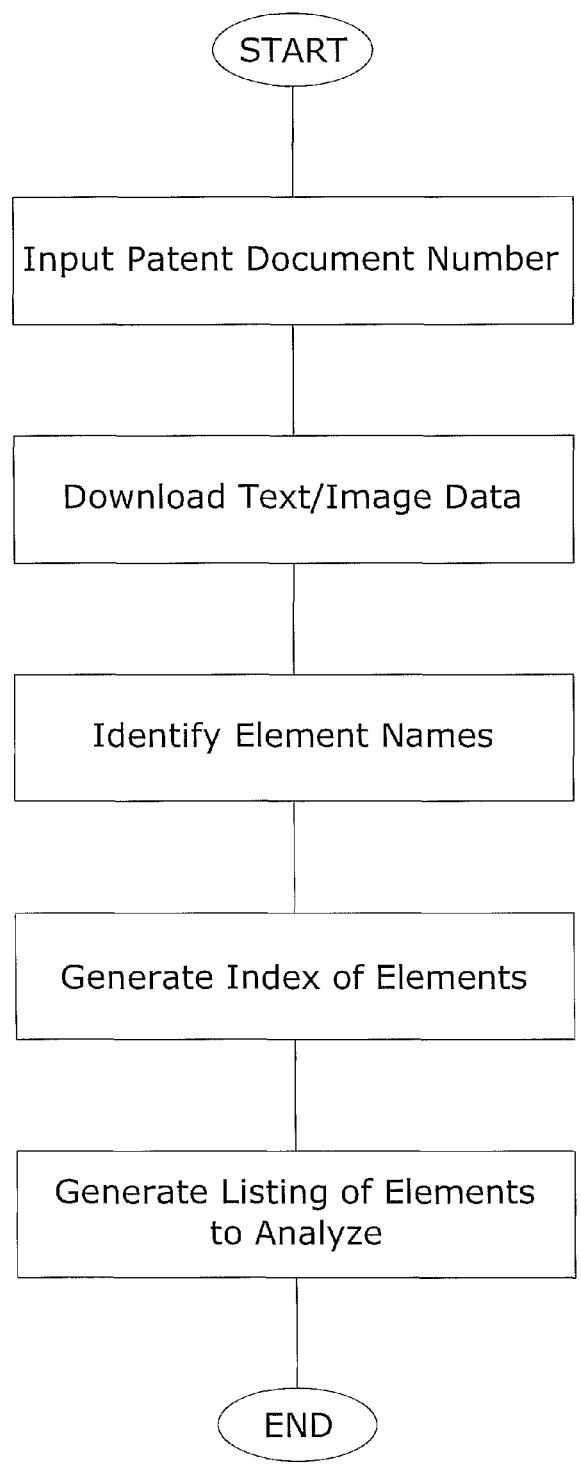
FIG. 2 is a flowchart illustrating the overall operation of the text analysis portion of the present invention.

FIG. 2 is a flowchart illustrating the overall operation of the text analysis portion of the present invention. A patent document number (e.g. patent number) is input by the user or other means into the present invention. The patent document is then downloaded utilizing known patent document downloading technology (e.g. PATENTHUNTER from Neustel Software, Inc.) or imported into the present invention by going to FILES/IMPORT FILE on the main menu. When importing a file (e.g. HTML, TXT, RTF, XML, DOC), the file is first located using a "browse" feature and then the file is imported into the present invention for analysis. It is preferable to download/import both the image and text data into the present invention, however only the text data (e.g. HTML, XML, TXT, RTF) or only the image data (e.g. PDF, TIFF, JPG) may be downloaded. In addition, patent documents being viewed by a user (e.g. using MICROSOFT INTERNET EXPLORER or MICROSOFT WORD) may also be analyzed by a plug-in into the program (e.g. right-click feature).

As shown FIGS. 2 and 4 of the drawings, the patent document number is entered into the interface of the present invention. FIG. 4 is an exemplary interface of the present invention illustrating an index of elements created for U.S. Pat. No. 5,444,333. The text data and the image data of the patent document are thereafter acquired into the present invention.

The element names are then identified within the text data of the patent document. The element names preferably are identified that have an element number behind them, however element names may be identified that do not have an element number corresponding with them.

An index of elements is thereafter generated based upon the element numbers and their corresponding element names as shown in FIGS. 2 and 4 of the drawings. The index of elements may be printed for the user to view and utilize when reviewing the patent. The index of elements is preferably a table having 2 or more columns because of the typical larger number of elements within a patent document, however the index of elements may be comprised of a listing of the elements. The index of elements preferably organizes the elements by their element numbers, however the index of elements may be organize the elements by their alphabetical order also. Special index of elements may also be created that are solely for individual figures. The index of elements may also be opened with a conventional word processor to allow for editing by the user to correct any errors in the index of elements. A listing of elements is further preferably created that may be utilized in analyzing the actual text of the patent document as discussed later herein.

2. Analyzing and Displaying Patent Document

Figure 3A:
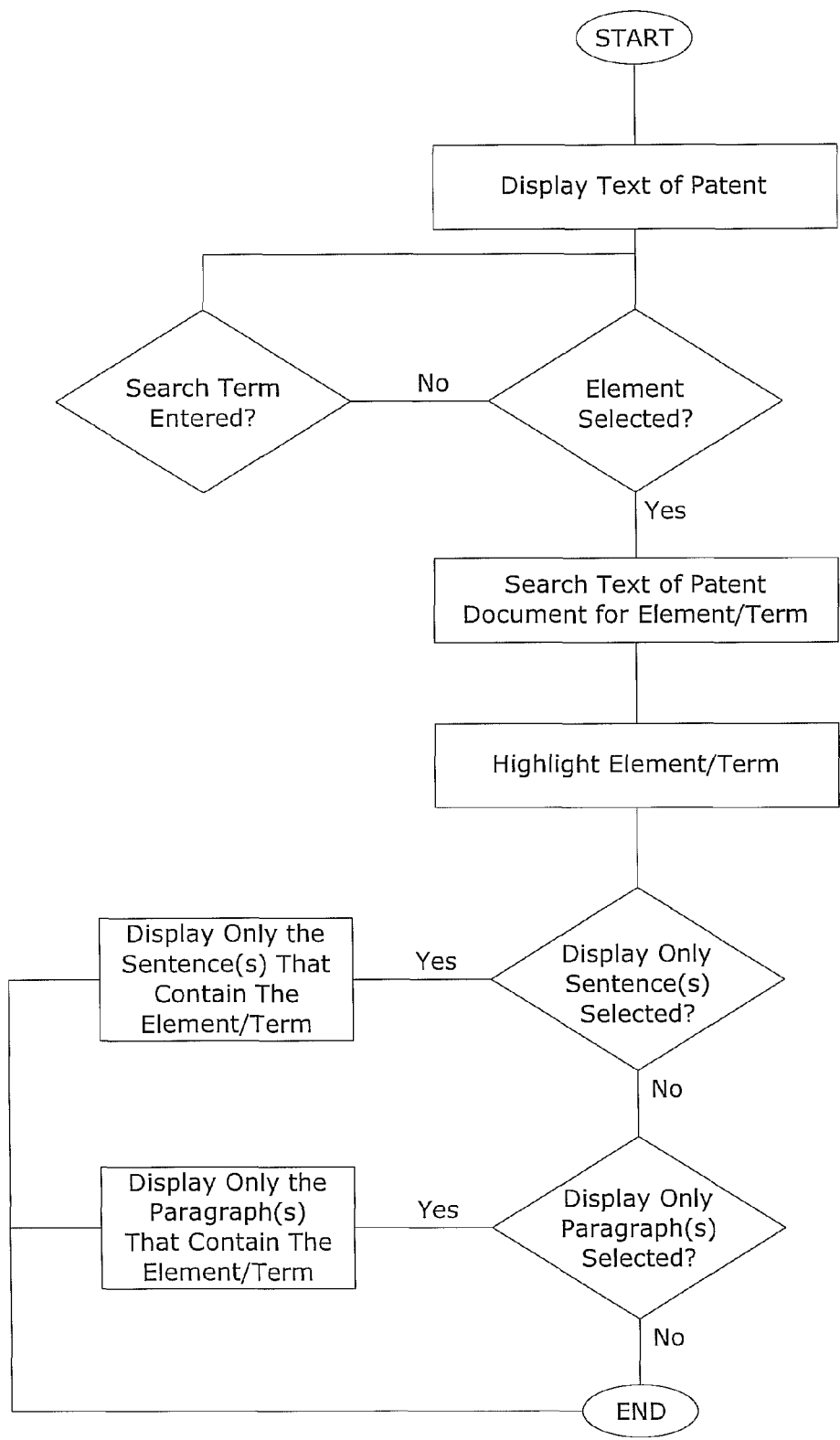
FIG. 3a is a flowchart illustrating the operation of the text analysis and display portion of the present invention.

FIG. 3a is a flowchart illustrating the operation of the text analysis and display portion of the present invention. The text of the patent is displayed within the present invention for the user to view along with the listing of elements for the user to select. The listing of elements preferably includes both the element number and element name. The elements may be utilized to analyze any portion of the patent document including the claims, specification and figures. In addition, the user may select a particular figure number to analyze wherein all sentences or paragraphs that contain reference to that figure will be shown.

Figure 6:
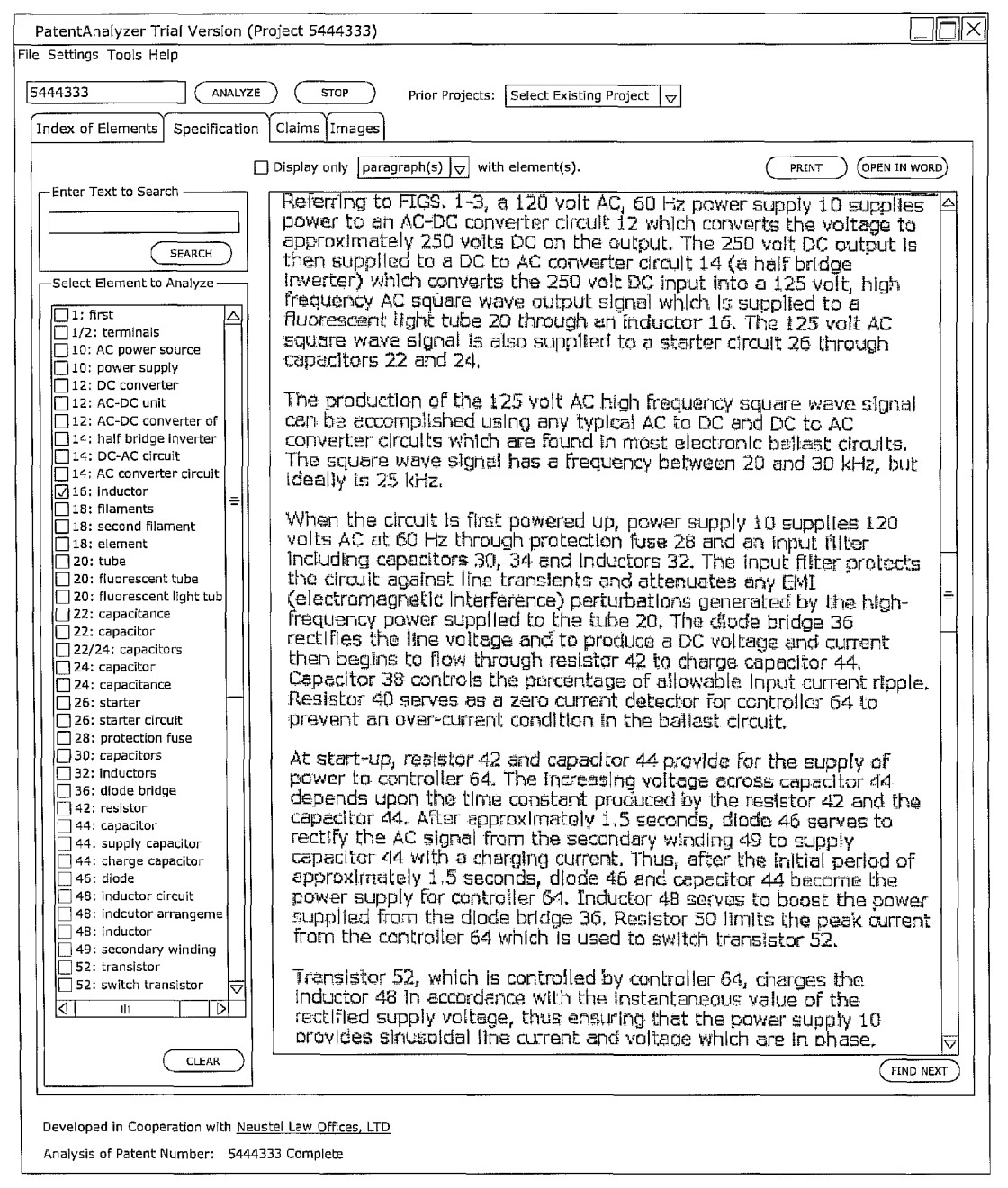
Figure 10:
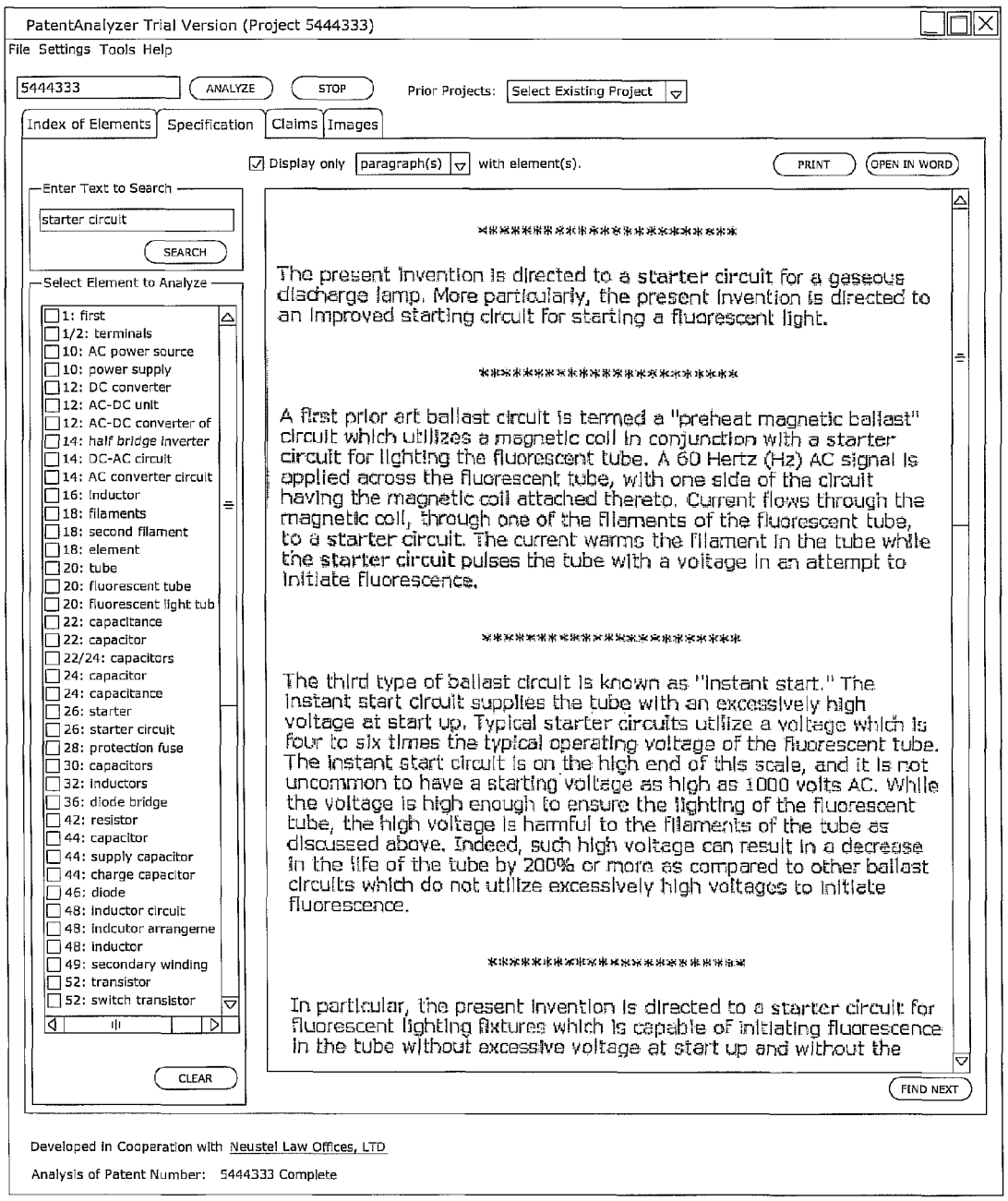
FIG. 10 is an exemplary interface of the present invention illustrating the highlighting of a search term (starter circuit) within the text portion of U.S. Pat. No. 5,444,333 and the displaying of only paragraphs containing the selected element.
Figure 11:
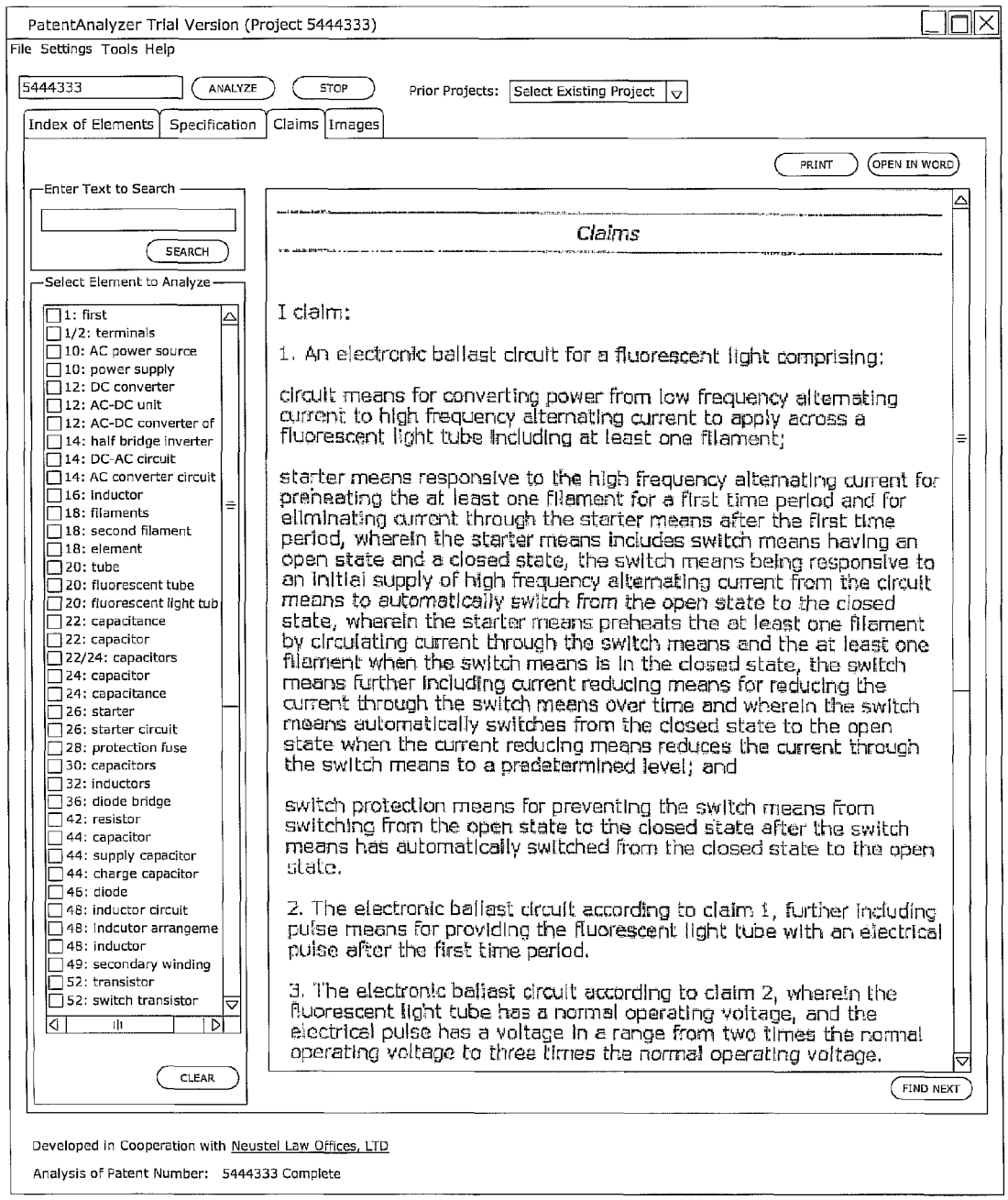
FIG. 11 is an exemplary interface of the present invention illustrating the claims of U.S. Pat. No. 5,444,333.

The user selects 1 or more elements to analyze from the listing of elements as shown in FIG. 6 of the drawings. The selected element(s) is thereafter emphasized throughout the patent text as shown in FIG. 6 of the drawings. In addition to selecting an element from the listing, the user may also enter a specific word(s) to search through the patent text and the same will be emphasized as illustrated in FIG. 10 of the drawings. The typing of the text to search may require the user to select a "search" or enter function prior to searching the patent document. Alternatively, the present invention may automatically begin searching the patent document after the entry of 1 or more characters (numbers, letters or combinations thereof) in an "on the fly" type of display. For example, if the user types "induct" the display of the present invention would emphasize all locations in the patent document that have the word "induct" within them. If the user continues to type "inductor" then the present invention would emphasize all locations in the patent document that have the word "inductor" within them. There may be a slight delay feature that waits to search the document until a preset/adjusted period of time has passed since the typing of the last character (e.g. 2 seconds).

Figure 15:
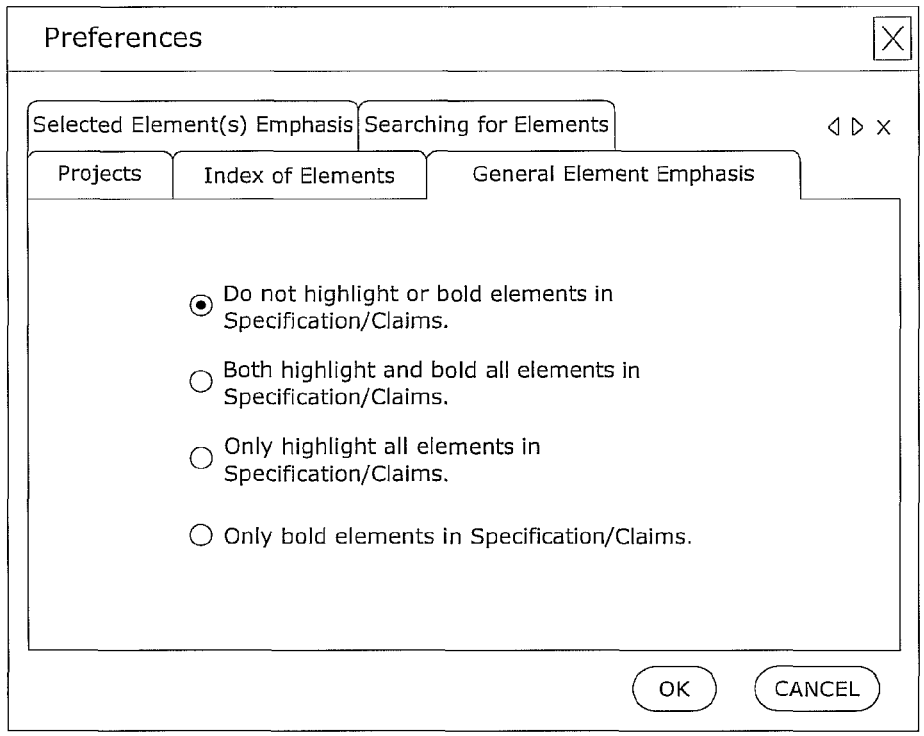
FIG. 15 is an exemplary preferences interface that allows for adjustment of the method of emphasizing all of the element names throughout the patent document.
Figure 16:
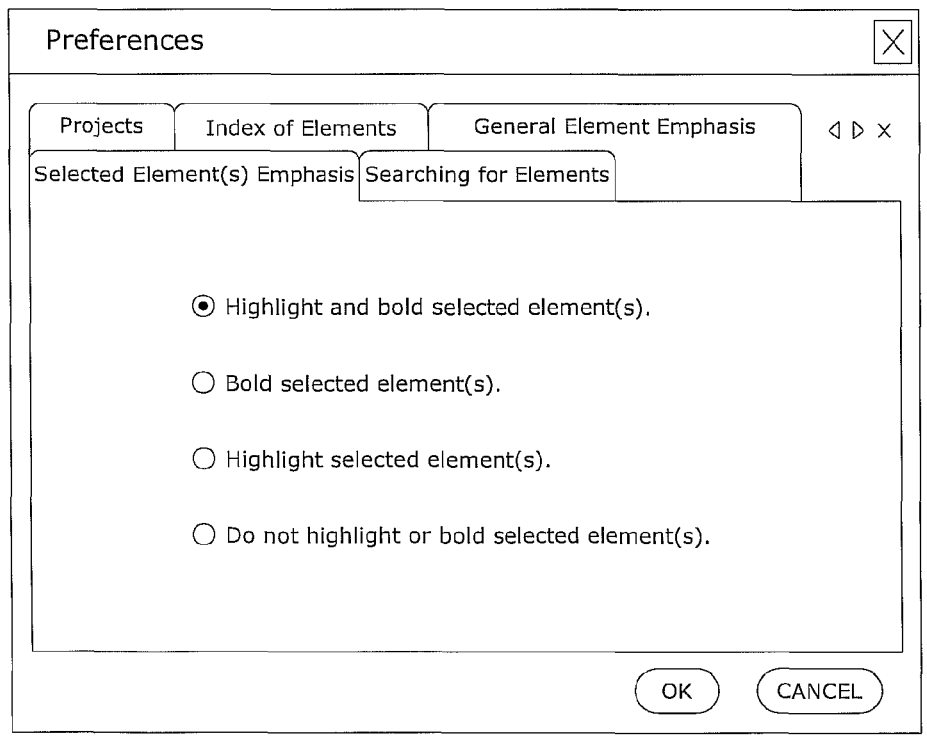
FIG. 16 is an exemplary preferences interface that allows for adjustment of the method of emphasizing selected element name(s) throughout the patent document.

The emphasis of the selected element(s) is preferably comprised of highlighting and bolding as shown in FIG. 6 of the drawings. However, the emphasis of the selected element(s) may be comprised of highlighting with a color (e.g. yellow), bolding, italicizing, underlining or any combination thereof that may be predetermined and/or adjusted by the user in the preferences section. In addition to emphasizing only the selected element(s), the user may adjust the present invention to automatically emphasize all elements identified throughout the patent text as shown in FIG. 15 of the drawings.

Figure 7:
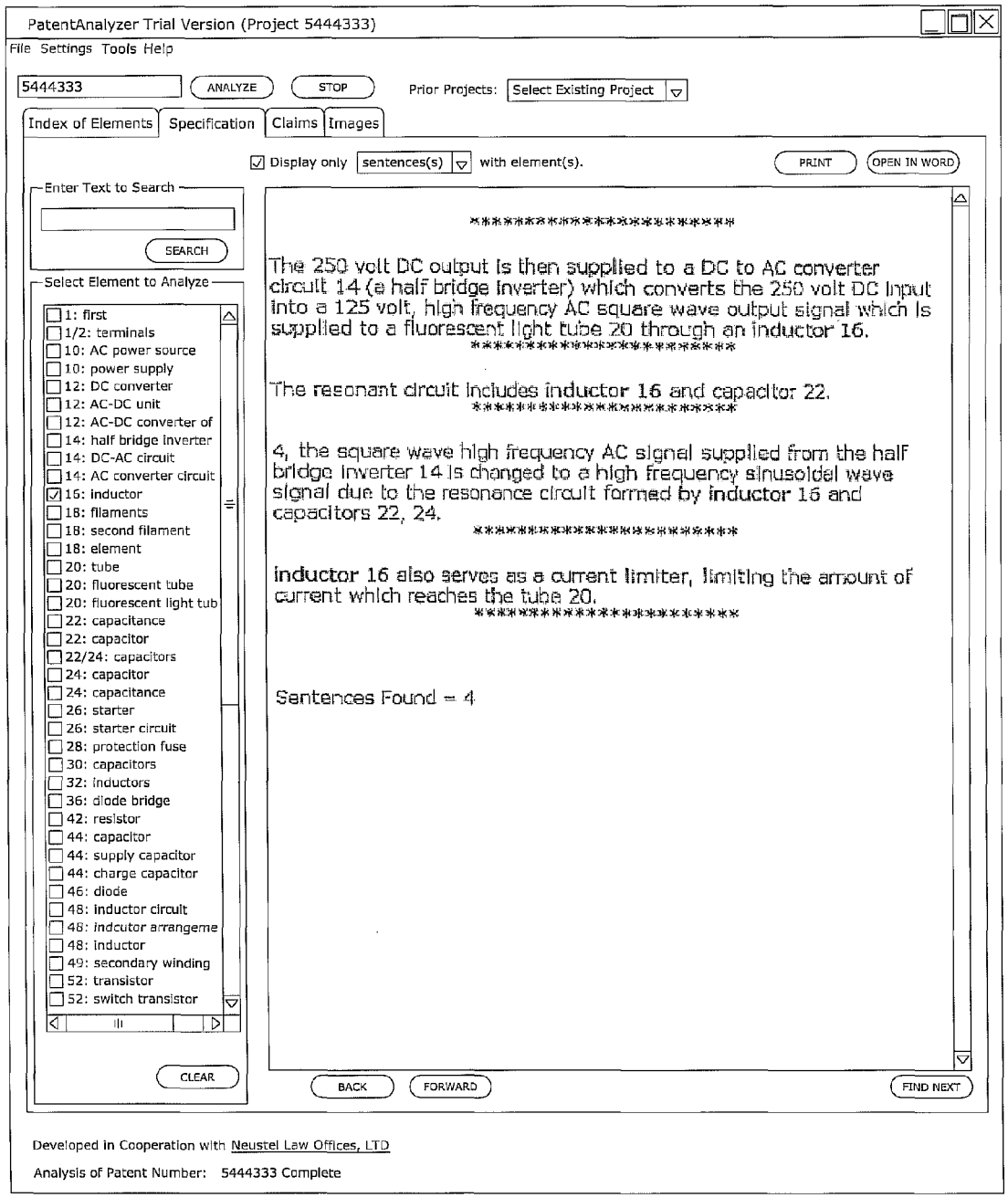
FIG. 7 is an exemplary interface of the present invention illustrating the highlighting of a selected element (inductor 16) within the text portion of U.S. Pat. No. 5,444,333 and the displaying of only sentences containing the selected element.
Figure 8:
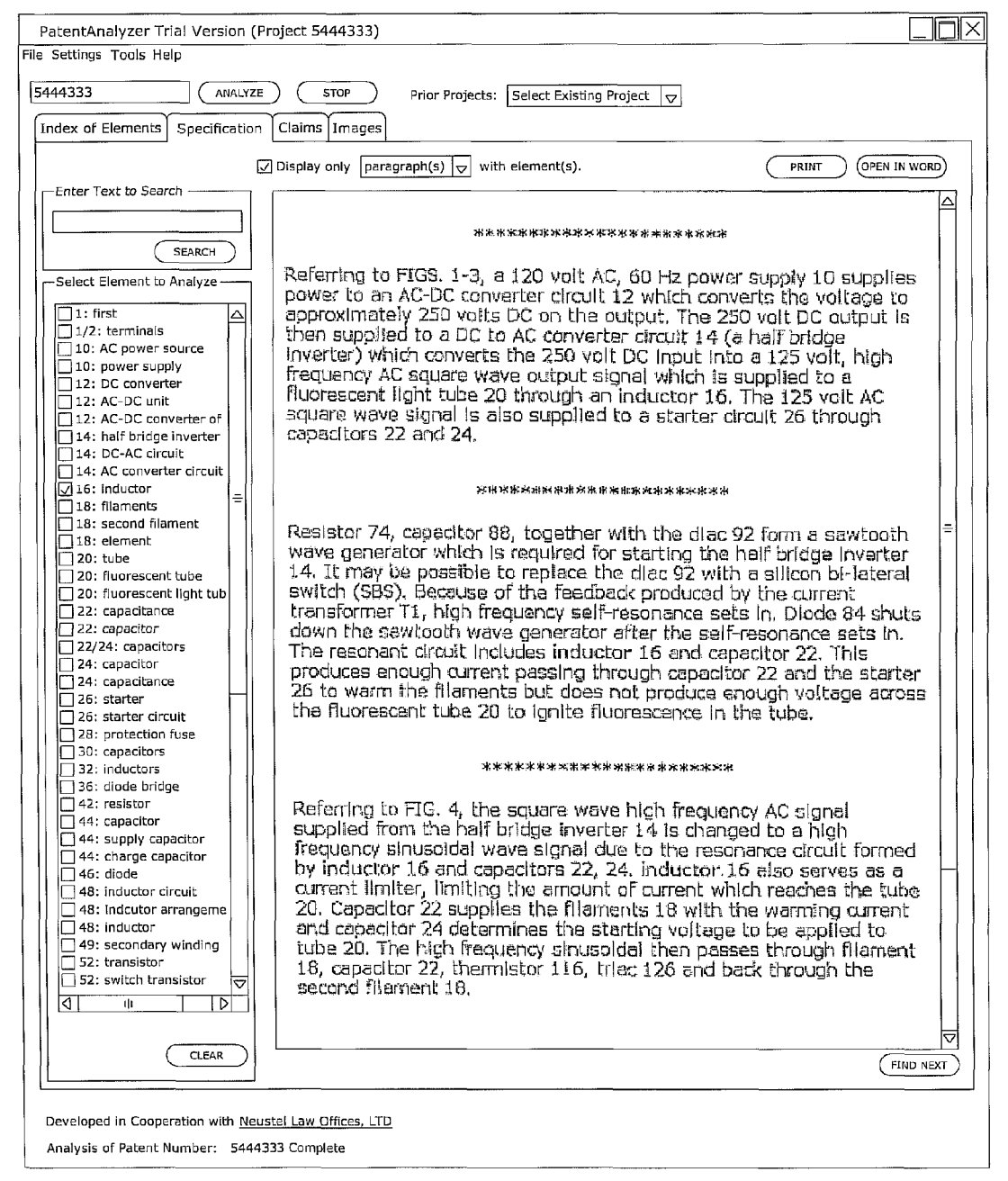

The user also has the option of displaying only the sentence(s) or paragraph(s) containing the selected element(s) (or entered terms) to quickly locate the important portions of the patent document that discuss the element(s) the user is reviewing as shown in FIGS. 3*a*, 7 and 8 of the drawings. When this feature is selected, only the sentence(s) or paragraph(s) containing the selected element(s) (or entered terms) will be displayed. A separator (e.g. ************** or horizontal line) is preferably positioned between each of the individually displayed sentences/paragraphs. In addition, it is preferable to display the heading of the patent document that each sentence/paragraph is from (e.g. BACKGROUND OF INVENTION, SUMMARY OF INVENTION, ABSTRACT, DETAILED DESCRIPTION OF INVENTION, CLAIMS). It is also preferable for the user to be able to "expand" the displayed text to show the sentence/paragraph before/after the displayed sentence/paragraph by using a right-click feature or including an icon within the displayed text for the user to select (e.g. +/−).

Figure 9:
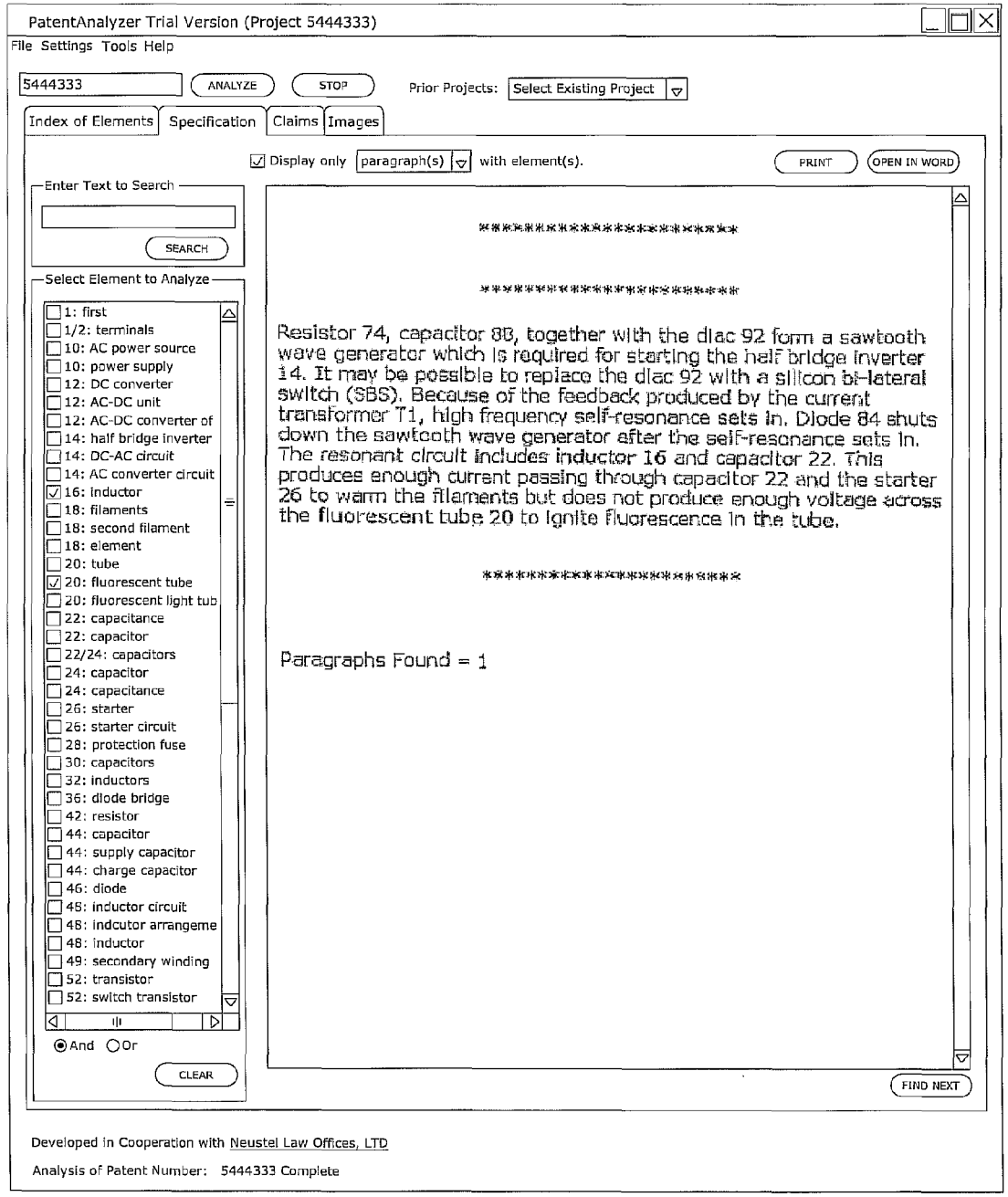
FIG. 9 is an exemplary interface of the present invention illustrating the highlighting of multiple selected elements (inductor 16 and fluorescent tube 20) within the text portion of U.S. Pat. No. 5,444,333 and the displaying of only paragraphs containing both of the selected elements.
Figure 17:
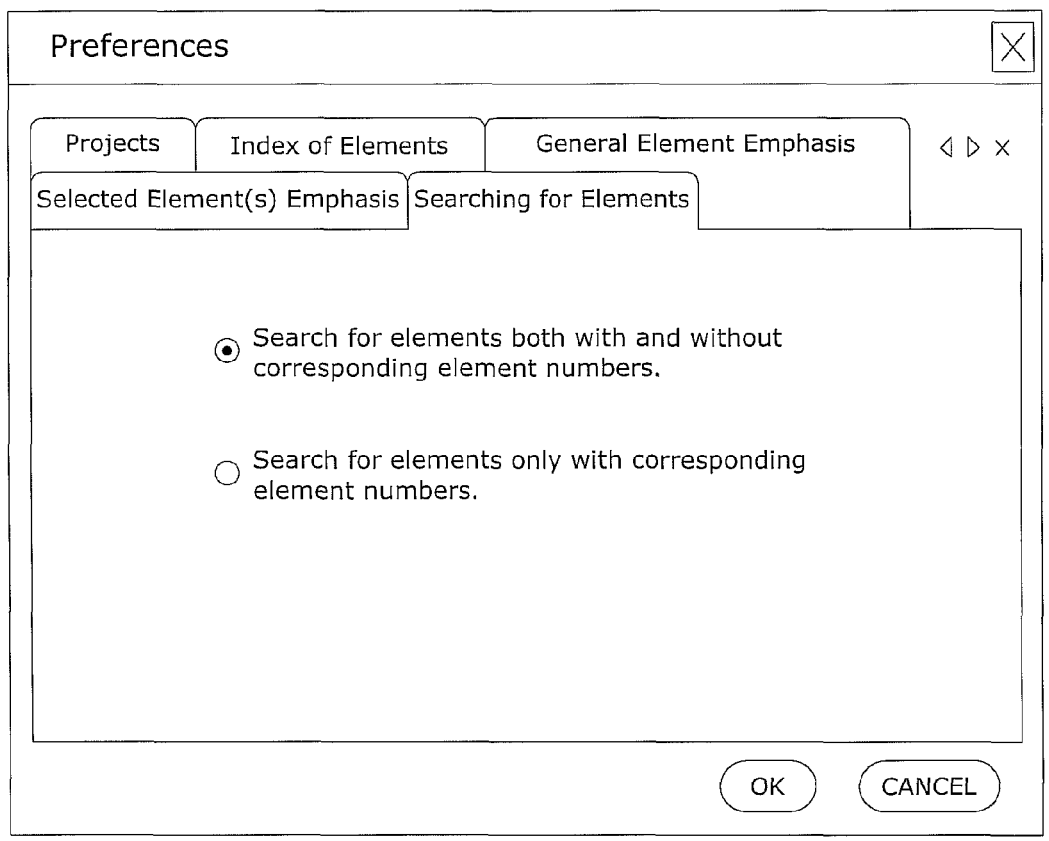
FIG. 17 is an exemplary preferences interface that allows for adjustment of the method of searching for element names within the patent document.

FIG. 7 illustrates where the user has selected element number 16 (inductor). The present invention searches all locations within the patent document that include both the element name "inductor" followed by the element number "16". Since only sentences are to be displayed in FIG. 7, only the sentences containing "inductor 16" as displayed within the present invention for the user to quickly view and read. FIG. 8 illustrates this displaying the paragraphs that contain "inductor 16" within them. If the user has selected the option in FIG. 17 that allows for emphasis of the element name throughout the patent document regardless if it has an element number or not, then all locations that contain the word "inductor" will be emphasized. FIGS. 7 through 9 best illustrate wherein the element names and corresponding element numbers are displayed in a first display area of the interface. FIGS. 7 through 9 further illustrate wherein the corresponding text portion that includes one or more selected element names is displayed in a second display area of the interface and wherein the second display area is separate from the first display area.

FIG. 9 illustrates the selection of two elements (inductor 16 and fluorescent tube 20). Only the paragraphs containing these two elements are displayed as shown in FIG. 9 of the drawings.

The selection of multiple elements to search within the patent document is preferably combined using an "and" search connector. However, the user may select an "or" connector which will show all paragraphs/sentences that contain either of the selected elements as shown in FIG. 9 of the drawings. The "or" connector is useful in situations where there may be multiple variations of a particular element name (e.g. "tube 20", "fluorescent tube 20" and "fluorescent light tube 20" in FIG. 9).

The user can clear the element(s) being searched and may choose new elements to search. The user may also select "back" and "forward" features to go back or forward with respect to their "history" of element searches which reduces the amount of time the user has to expend when searching through various element names (see the Back and Forward buttons in FIG. 7). A detailed history may also be shown that lists all of the elements and combination of elements the user has researched within the patent document to allow the user to reselect the same.

The user can copy/paste, open in an editable document and/or print the sentence(s)/paragraph(s) displayed for one or more selected elements.

3. Identifying Element Names

Figure 3B:
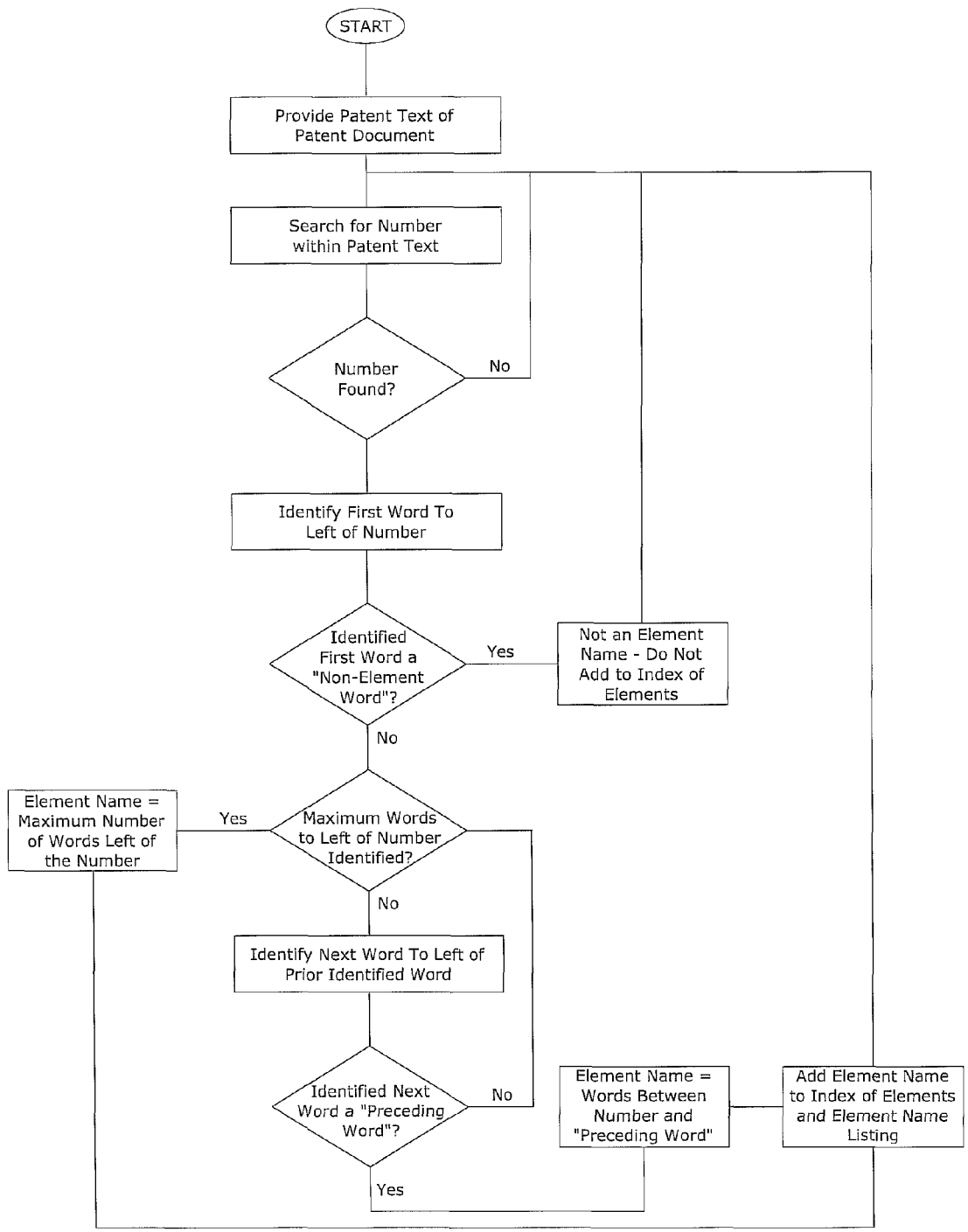
FIG. 3b is a flowchart illustrating the identification of element names within a patent document.
Figure 12:
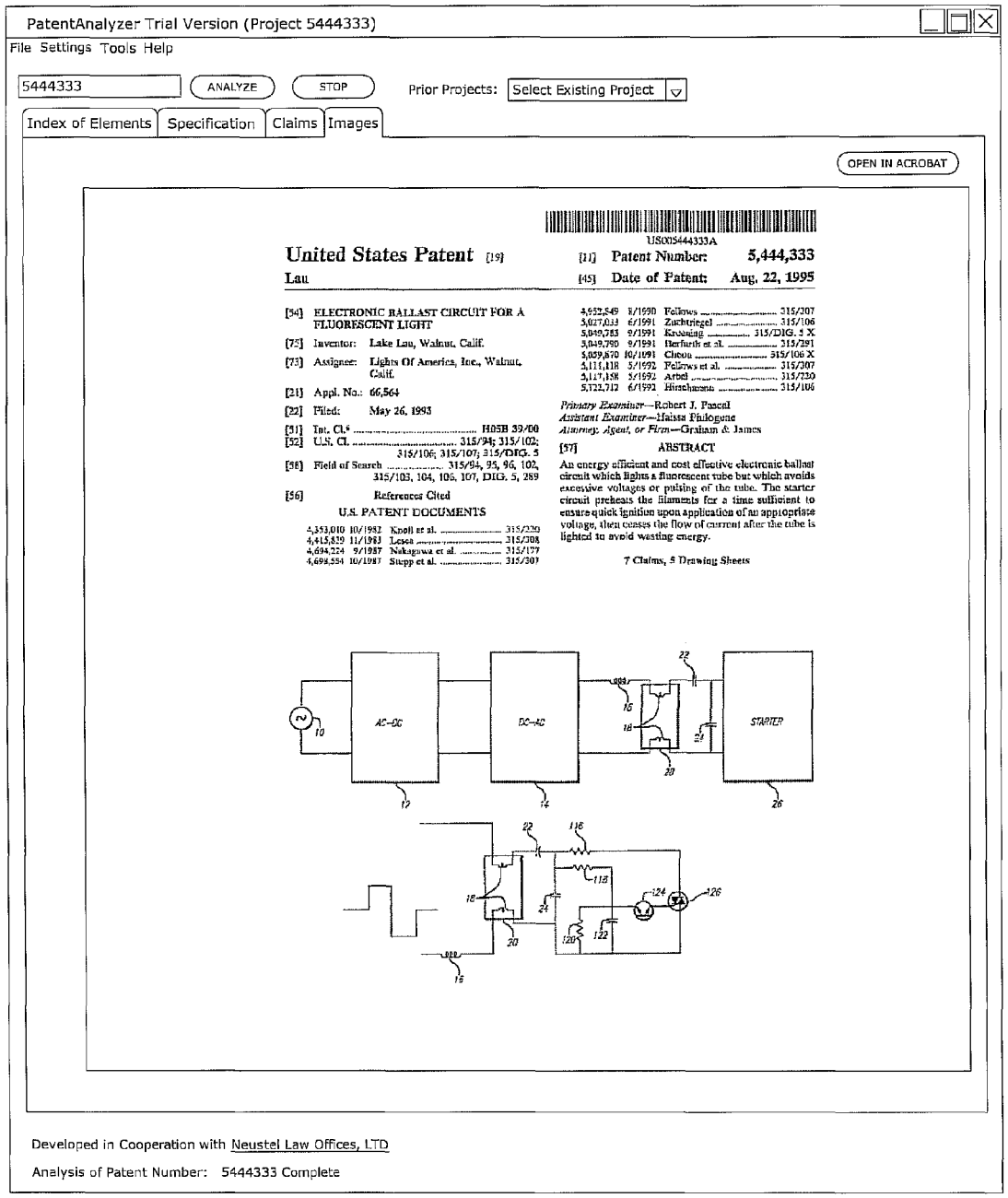
FIG. 12 is an exemplary interface of the present invention illustrating the images of U.S. Pat. No. 5,444,333.
Figure 13:
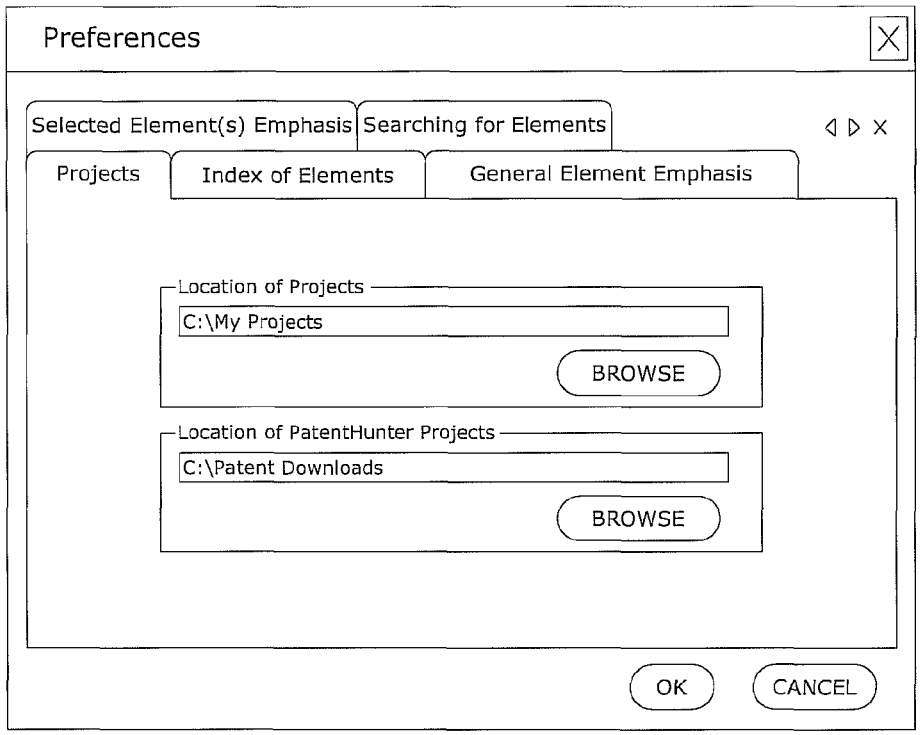
FIG. 13 is an exemplary preferences interface that allows for the modification of the file locations of products and the location of image files.
Figure 14:
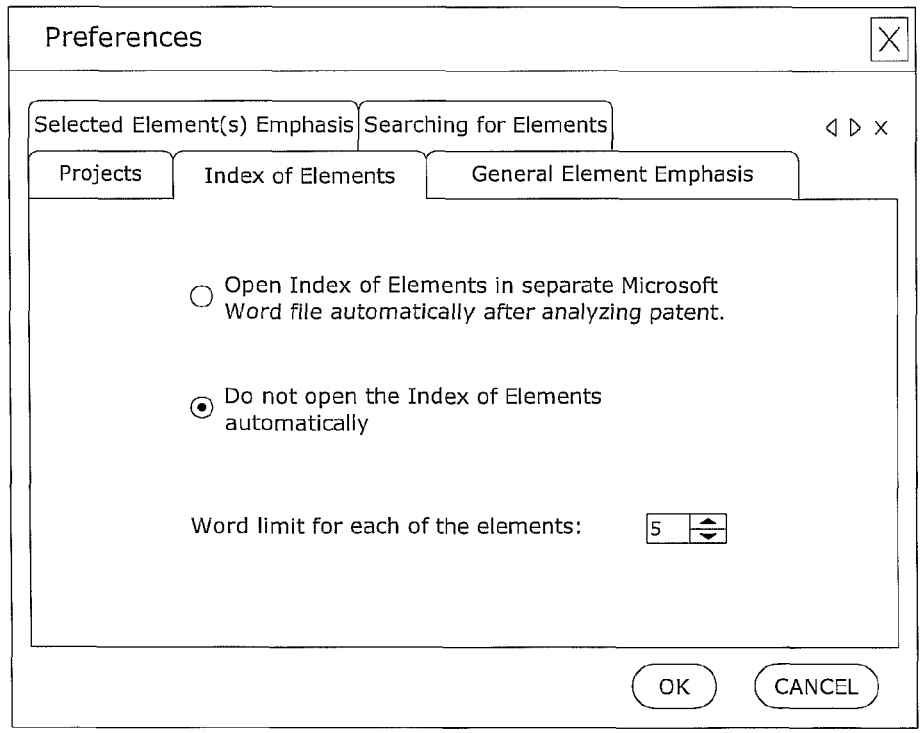
FIG. 14 is an exemplary preferences interface that allows for the selection of whether or not to automatically open the index of element after analyzing the patent, and also allows for adjusting the number of words allowed for each element name.

A significant feature of the present invention is the ability to identify the "element names" used to identify/label each of the element numbers" (i.e. the reference numerals used in the patent drawings). A patent document may have only a few elements or hundreds of elements in it. Each of the elements is typically identified in the patent drawings with a reference numeral as shown in FIG. 12 of the drawings. FIG. 3*b* is a flowchart illustrating the identification of element names within a patent document. Below is a basic step-by-step identification of element names within a patent document:

Step #1: Identify an Element Number

Step #2: Identify word(s) to the left of the Element Number until either a Preceding Word or a paragraph break is found (or a period followed by at least one space for a sentence).

Step #3: Check to ensure that a Non-Element Word is not directly next to the Element Number (if so, this is not an element name).

i. Element Number

An "Element Number" is a number (or a number followed by a letter or other character immediately thereafter without a space) that is comprised of one or more digits (Example: "As shown in FIG. 12, the metal hammer 12a is used to . . . " the "12a" is the Element Number"). The element number may be comprised of 1, 2, 3, 4 or more numbers along with other letters/characters positioned immediately thereafter (e.g. 12, 20a, 20b, 30', 30").

ii. Preceding Words

A "Preceding Word" is a word (or phrase or character) that immediately precedes an element name (Example: "As shown in FIG. 12, the metal hammer 12a is used to . . . " the word "the" is a Preceding Word). The present invention utilizes a database of preceding words to be used in identifying preceding words within the patent document. Various types of words are always a preceding word (e.g. a, an, the, are, illustrates, produces, represents, then, to, utilizes, when, within, etc.). Certain phrases (e.g. "by cooking"), characters (e.g. comma, semi-colon) and formatting (e.g. paragraph break) may also be used as "Preceding Words".

The preceding words are words/phrases are words/phrases that are typically not utilized by a patent applicant to identify/label elements of the invention or other items. The types of words preferably used as "Preceding Words" in the database are articles (e.g. a, an, the, said), prepositions (above, near, at, by, after, with, from), conjunctions, (e.g. and, or, because, but, or, since, so, until, while, both, not only, either, whether, after, before, although, though, consequently, furthermore, instead, conversely), verbs (e.g. have, run, be, do, creates, directed, executed, compiled, adverbs (e.g. how, where, earlier, next, then, first, second, third, fourth, there), contractions (e.g. can't, don't, isn't), pronouns (e.g. I, me, she, who, he, her, him, it, you, they, them), some punctuation marks (except "−" or ""), expletives (e.g. of course, at least, in fact, clearly, definitely, certainly, naturally), relative adjectives (e.g. which, that, what, whichever, whatever) and symbols (!, /, *, @, $). The database of preceding words is used to determine if a word to the left of the element number identified is part of the element name or is a preceding words that serves as the left-most stopping point for determining the element name. There are exceptions to this general rule which may require modification of the database of words to accurately reflect words that typically precede an element name.

The database of preceding words may be updated periodically to reflect modern terminology utilized in patent documents. The database of preceding words may also be edited by the user to allow for the addition or deletion of preceding words if they are experiencing problems with the current listing of preceding words.

iii. Element Names

The "Element Name" is the actual name of the element which can be one or more words. The Element Name is the word(s) positioned between the Preceding Word and the Element Number (Example: "As shown in FIG. 12, the metal hammer 12a is used to . . . " the Element Name is "metal hammer" because the Element Number is "12a" and the Preceding Word is "the"). An element name is any label used by the patent application to identify a feature, structure or other thing contained in the patent drawings (or not shown in the patent drawings. The element name typically is followed by an element number however this is not required. The type of words preferably utilized for elements names include nouns (e.g. hammer, handle, signal) and adjectives (e.g. big, cold, blue).

iv. Non-Element Words

A "Non-Element Word" is any word, phrase or character that would not typically immediately precede an element number. For example, a Non-Element Word may in fact typically precede a quantitative number or may be a phrase commonly utilized to identify indicia in the drawings (e.g. approximately, subtracts, multiplies, averages, January, December, by arrows, Figure, Figures, patent number, reference numeral). A Non-Element Word database is maintained within the present invention. The Non-Element Word database typically includes a substantial portion of the Preceding Words (see above), however the Non-Element Word database may include additional words based upon word usage in patent documents (or some removed). Non-Element Words are preferably comprised of proper nouns (e.g. Tom, Delaware, Titanic), certain punctuation marks (e.g. ?, ;), symbols (!, /, *, @, $), verbs (e.g. run, cut) and months (e.g. January, December).

As shown in FIG. 3b of the drawings, the present invention first identifies a number within the patent document (some portions of the patent document may automatically be ignored such as the cover page or the BACKGROUND OF INVENTION). Once a number is found, the first word to the left of the element number is identified. If the first word is a "Non-Element Word" (i.e. a word, phrase or character that would not typically precede an element number) then the number is disregarded. The database of "Non-Element Words" is preferably periodically updated and may also be directly edited by the user at anytime.

If the word(s) to the left of the number is not a "Non-Element Word" (based on comparing with the words/phrases of the Non-Element Word database), then the number is then determined to be an "Element Number" and the present invention continues to identify the Element Name by identifying the word(s) to the left of the Element Number until either (1) a "Preceding Word" is identified (based on comparing with words in the Preceding Word database) or (2) the maximum number of words is reached for the element name. If a Preceding Word is identified to the left of the Element Number, then the Element Name is equal to the words between the Element Number and the Preceding Word (excluding the Preceding Word of course). If a Preceding Word is not identified after a present or user adjusted number of words to the left of the Element Number (e.g. 5 words), then the present invention terminates further searching to the left and accepts the maximum number of words to the left of the element number as the element name. The maximum number words to the left may range from 1-10, however it is preferable that the maximum number of words be set to either 3, 4 or 5 maximum words. The Element Name is thereafter added to the index of element and the element name listing database (along with the corresponding Element Number). Various database formats may be utilized to store the Element Name and Element Number.

This process continues until each of the element numbers have been identified and the corresponding element name is identified.

4. Resolving Element Name Conflicts

Some patent documents may have multiple variations of element names within them for various reasons. For example, U.S. Pat. No. 5,444,333 uses two element names for element number 20: "tube 20", "fluorescent tube 20" and "fluorescent light tube 20" as shown in FIG. 9 of the drawings. It is desirable to have a solution for resolving these conflicting variations to avoid 2 or more element names being used for an individual element number.

Figure 3C:
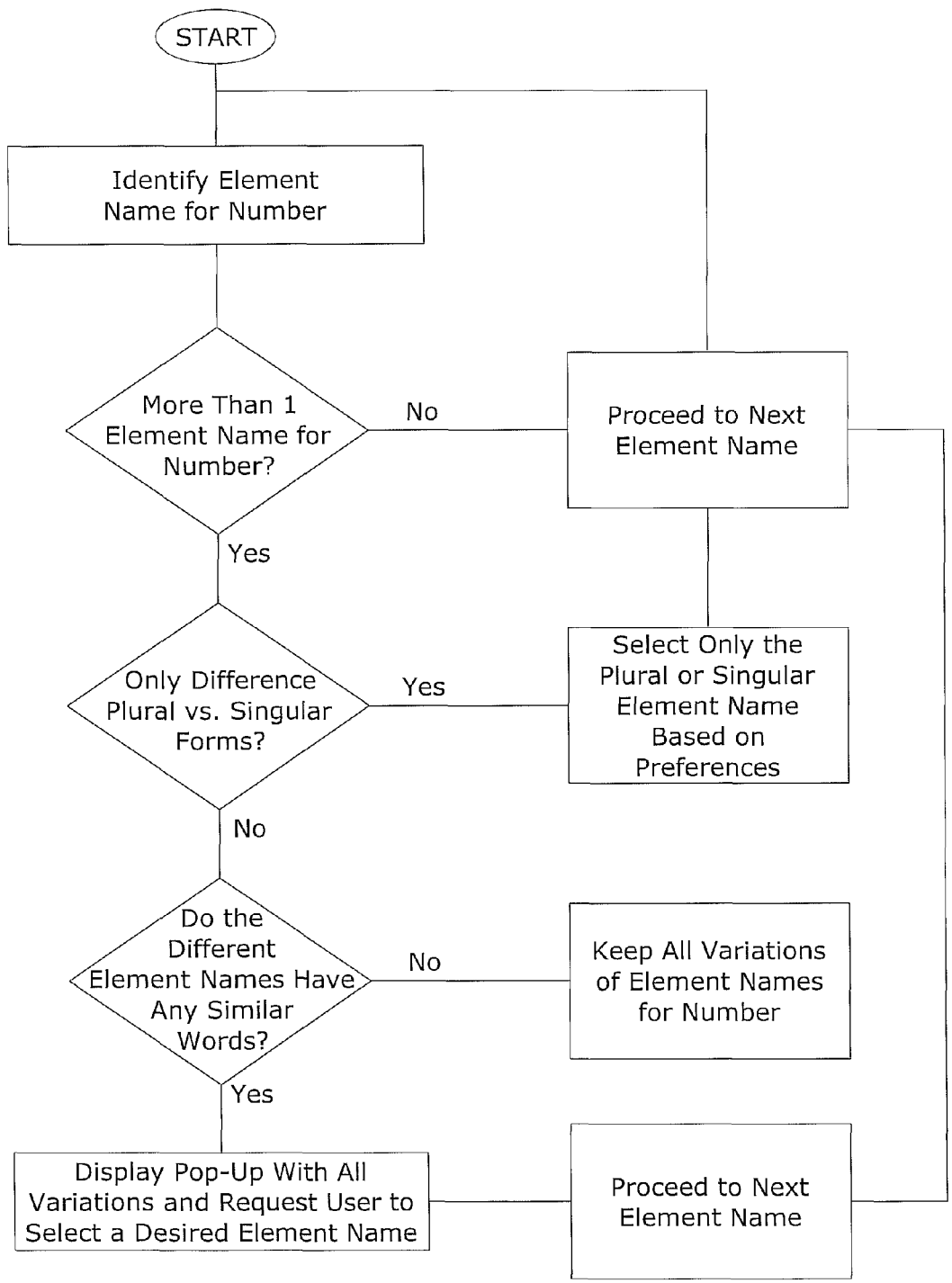
FIG. 3c is a flowchart illustrating a first process for resolving multiple element name variations for a single element number that utilizes the user's selection of a desired element name.

FIG. 3c is a flowchart illustrating a first process for resolving multiple element name variations for a single element number that utilizes the user's selection of a desired element name. As shown in FIG. 3c, if the only difference between the variations is a plural vs. singular form, then the present invention automatically selects only one of the variations based upon the preset or user selected option (e.g. the user may want the plural form to always be selected). If the variation is more than just a singular/plural form usage, then the present invention determines if there are any similar words in all of the variations. If there are no similar words, then the present invention will keep all of the variations (or ask the user to select one) and continues to the next element name. If there are similar words in all of the element names which is typically the case, then a pop-up or other selection option is displayed requesting the user to select which variation of the element name they would like to use. The selected variation by the user is thereafter used as the element name. It can be appreciated that the plurality vs. singular test does not have to be performed.

Figure 3D:
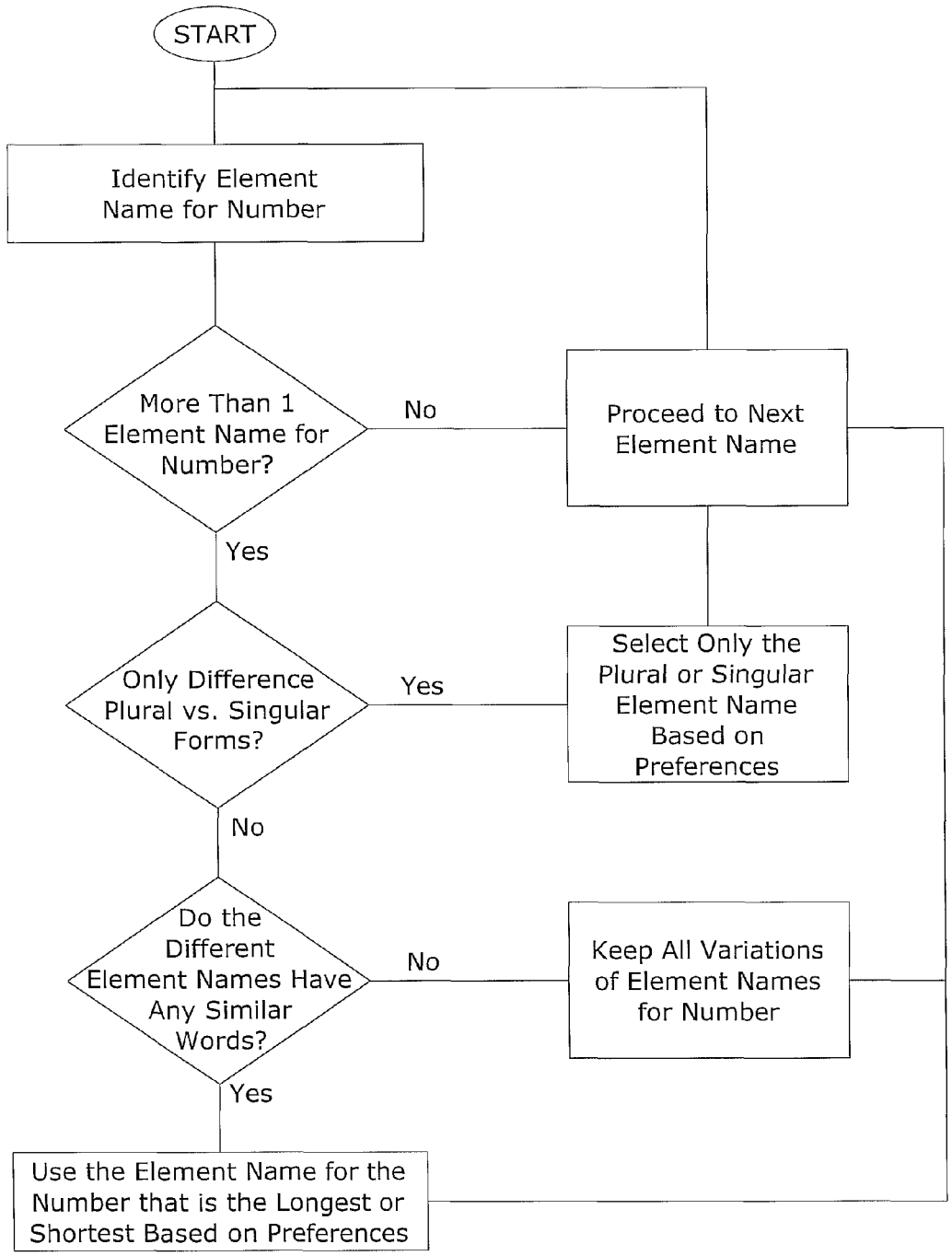
FIG. 3d is a flowchart illustrating a second process for resolving multiple element name variations for a single element number by using the element name from the variations that is either the longest or shortest based on a preference setting.

FIG. 3d is a flowchart illustrating a second process for resolving multiple element name variations for a single element number by using the element name from the variations that is either the longest or shortest based on a preference setting. For example, if the user wants the longest element name (i.e. the most words) to be used, the present invention chooses the element name that is the longest. If 2 or more element names are the longest then the user is preferably prompted to choose which one to use.

Figure 3E:
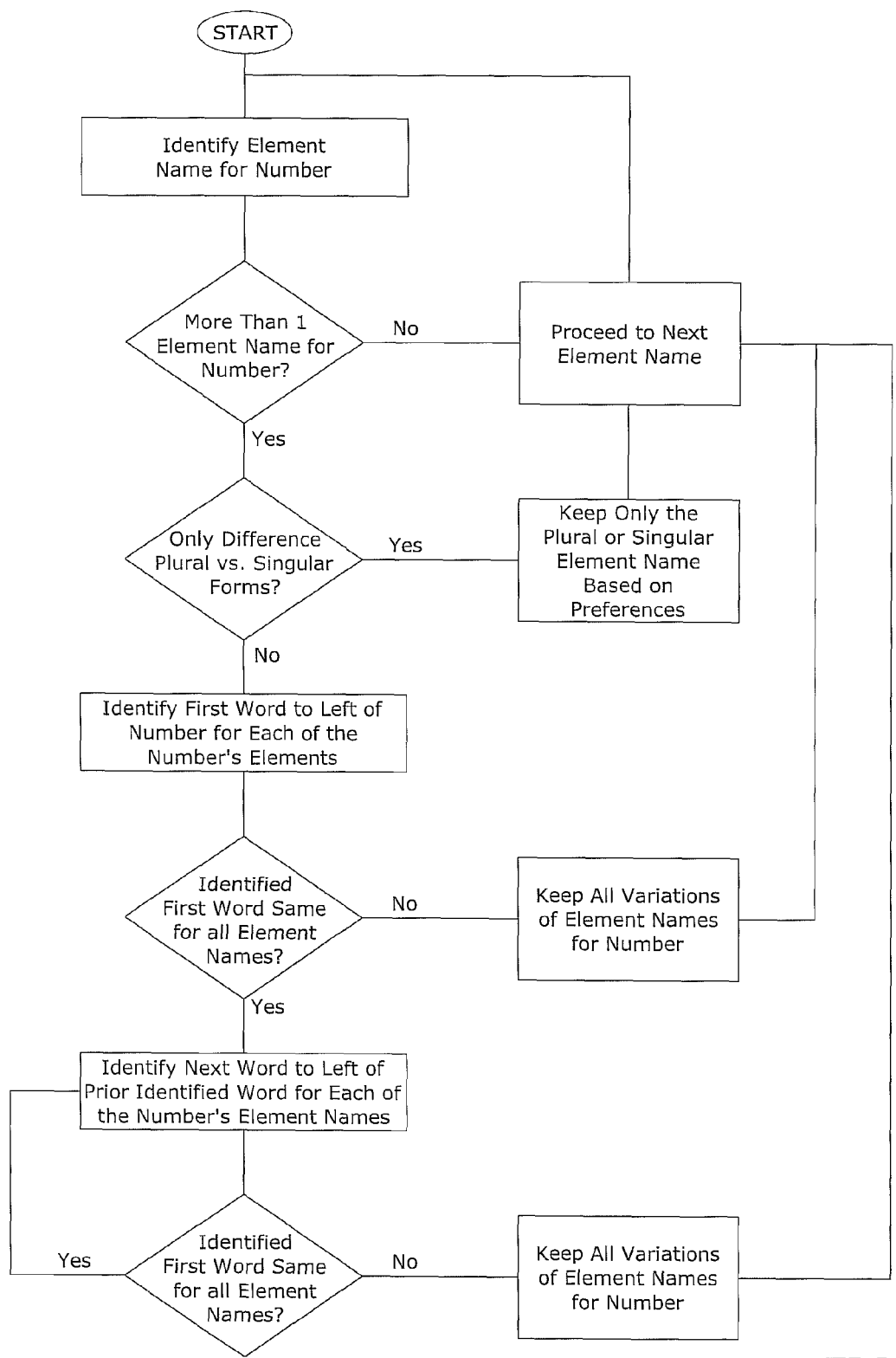
FIG. 3e is a flowchart illustrating a third process for resolving multiple element name variations for a single element number by identifying the commonly shared words immediately to the left of the number in each of the element name variations.

FIG. 3e is a flowchart illustrating a third process for resolving multiple element name variations for a single element number by identifying the commonly shared words immediately to the left of the number in each of the element name variations. For example, in U.S. Pat. No. 5,444,333, the element name that would be used for element number 20 would only be "tube" since that is the only commonly shared word to the left element number (the $2^{nd}$ to the left word is different). Alternatively, the present invention may identify the element name variation that the other variations use the words in and thereby eliminates the other element name variations as having superfluous word(s) in them.

Figure 3F:
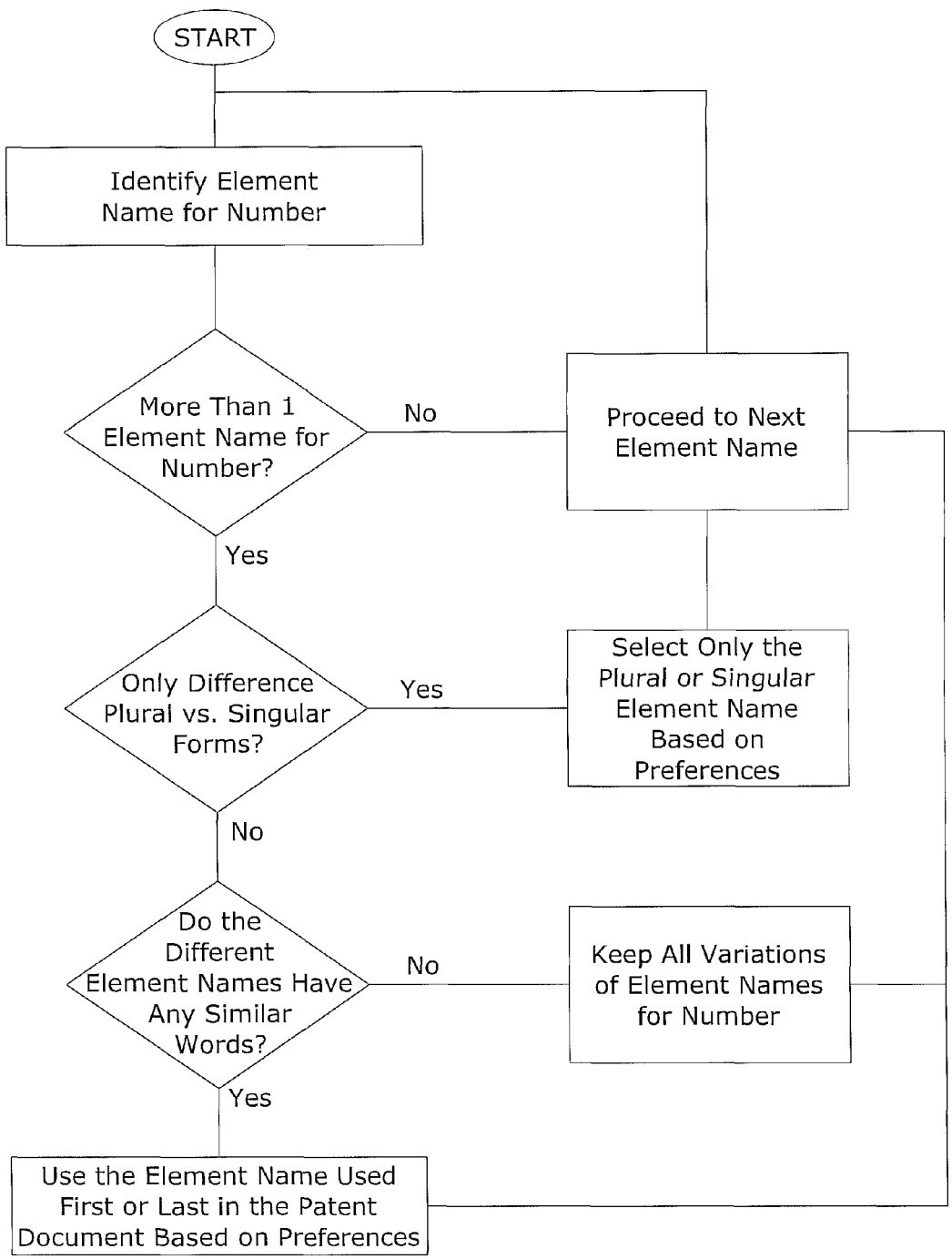
FIG. 3f is a flowchart illustrating a fourth process for resolving multiple element name variations for a single element number by using the element name from the variations that is used first or last within the patent document based on a preference setting.

FIG. 3f is a flowchart illustrating a fourth process for resolving multiple element name variations for a single element number by using the element name from the variations that is used first or last within the patent document based on a preference setting. This would be preset or user selected to help simplify the selection of a single element name for each element number. For example, the user may select that when conflicting element names are found for a specific element number that only the first instance of the element name used in conjunction with the element number would be used and all other element name variations disregarded.

Figure 3G:
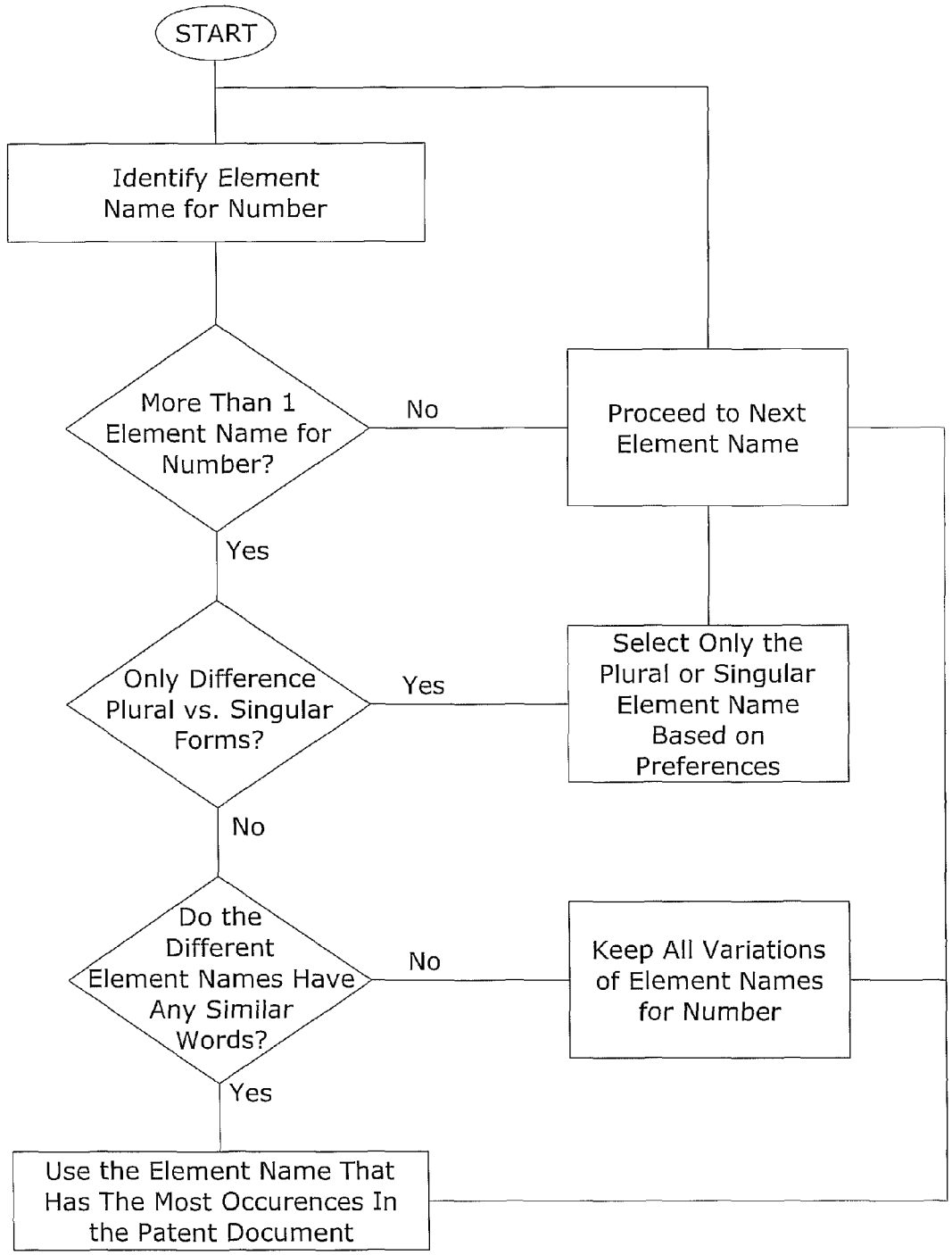
FIG. 3g is a flowchart illustrating a fifth process for resolving multiple element name variations for a single element number by using the element name from the variations that is used the most (i.e. the greatest number of occurrences) throughout the patent document.

FIG. 3g is a flowchart illustrating a fifth process for resolving multiple element name variations for a single element number by using the element name from the variations that is used the most (i.e. the greatest number of occurrences) throughout the patent document. For example, with element number 20 for U.S. Pat. No. 5,444,333, the term "tube" is used the most to identify element number 20 and would be the only element name used to identify element 20.

E. Image Analysis and Image Writing Over of Patent Documents

1. Labeling Element Numbers in Figures

Figure 18:
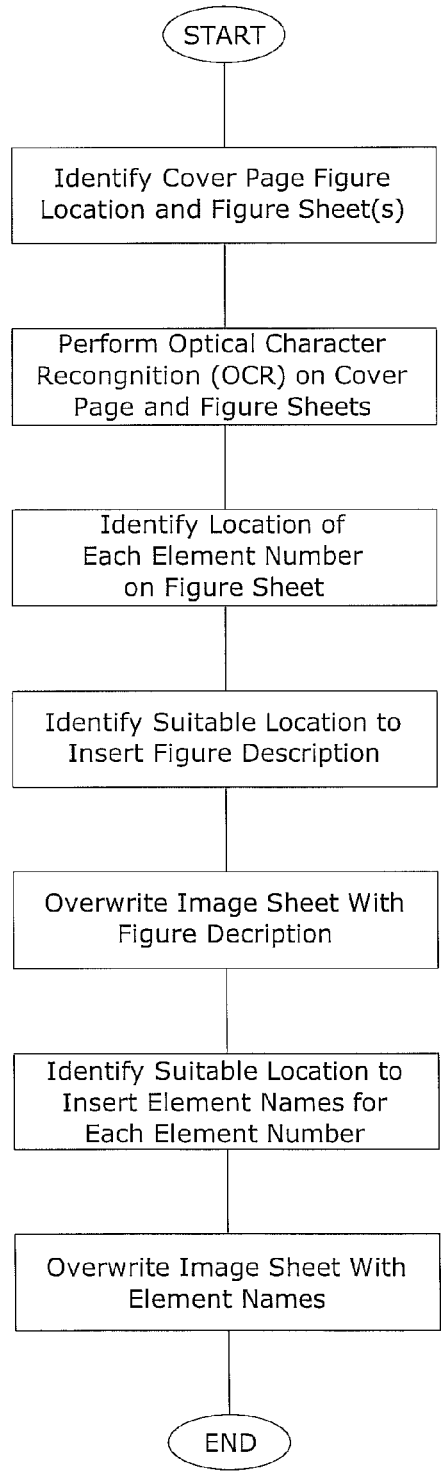
FIG. 18 is a flowchart illustrating the patent figure analysis and overwriting procedure for inserting element names and figure descriptions into the figures.

It is desirable to label the element numbers within the patent figures of the patent document (including the figure selected for the cover page). This process comprises (1) identifying the figures of the patent document, (2) performing an optical character recognition (OCR) process of the figures, and (3) creating a new image file for each of the image sheets containing the element names adjacent the element numbers and/or a description of each of the figures on each image sheet. FIG. 18 illustrates the overall process of analyzing the figures of the patent document. A "key" may also be placed on the figure sheet instead of individually labeling each of the element numbers wherein the "key" is comprised of the element names corresponding to the element numbers shown on the figure sheet for a quick reference by the user.

i. OCR Process

OCR processes have been in use for years and the present invention may utilize any conventional OCR process to identify the drawing sheets, the element numbers and/or figure numbers within each drawing sheet. The location of the element numbers is also determined during the OCR process so that a determination may be made as to where to insert the element names during the overwriting process. Various file formats may be used (e.g. TIFF, PDF) for the OCR process, however it is preferable that the TIFF file format be utilized.

During the OCR process, the header of a patent document typically will have "Sheet_of_" along with other identifying information. Text portions of a patent document do not have this at the top of their pages, so this is used to identify the drawing sheets of a patent document. Other methods may be used to identify the drawing sheets such as (1) identifying the first set of pages with little text in them, (2) identifying the first set of pages with a lot of white space, (3) identifying the first set of pages with "FIG. _" on them, or (4) identifying the first page containing the text BACKGROUND OF THE INVENTION (or other text used on the first textual page of the patent document) thereby the pages between the cover page and the identified page are the drawing sheets.

Once the cover page (the $1^{st}$ page) and the drawing sheets are identified, the present invention then OCR's these pages to identify the location of the figures and the element numbers. During the OCR process the figures may need to be rotated 90 degrees to compensate for figures that use the landscape layout (instead of the regular portrait layout). It is important on the cover page to only OCR the lower portion of the page containing the patent figure and not the text portion of the cover page.

Once the OCR process has been performed on the drawing sheets (and the cover page), the present invention then determines a suitable location to overwrite the image with the text of the element name for each of the corresponding element numbers on the drawing sheet. It is preferable to search to the left/right/bottom/top of the specific element number to determine if a certain percentage (e.g. 5%) of the pixels in a required area to insert the text into has black/gray pixels within which indicates a non-suitable location to put the text (e.g. where a line of the figure is). It is preferable to position the text of the element name to either the left/right side of the element number as shown in FIG. 20 of the drawings. However, if there is no location available to the left/right of the element number, then the present invention considers positioning the element name above/below the element number. If no suitable location is found, the element name may either be positioned somewhere else on the drawing sheet near the element number or in a "key" for element names that have no suitable location (where the key is positioned in a convenient and "clean" location on the drawing sheet). It is preferable to place brackets or include another identifier to identify that this text is being added to the figure sheet and is not original text.

In addition, the present invention identifies the sheets containing the figure numbers (e.g. FIG. 1, FIG. 2, etc.) and then also identifies the corresponding figure description text in the BRIEF DESCRIPTION OF THE DRAWINGS section of the patent document. The present invention inserts the description of the figure either directly above/below the figure number or at the top/bottom of the page. The same process of identifying white space is preferably utilized for the figure description text insertion to ensure that the added text does not overwrite the original lines/text of the drawing sheets.

The final image file (e.g. TIFF or PDF) formed from the above process then contains the figure descriptions added to each drawing sheet and/or identification of the element numbers by element name as shown in FIG. 20 of the drawings. FIG. 19 illustrates an index of elements created using the present invention for U.S. Pat. No. 6,793,429 referred to hereinafter as "the '429 patent."

After sheet 2 of the '429 patent is OCR'd, the figure descriptions added and the element names added, FIG. 21 provides an exemplary illustration of what the user will see (and be able to print).

2. Adding Key of Elements for Figures

Instead of identifying the element name for each element number directly next to the element number in the drawing sheets, a simple "key" of elements may be added to each drawing sheet containing the element names for the element numbers identified on the particular drawing sheet.

3. Overwriting Abstract of Cover Page with Element Numbers Included

It is preferable to identify the Abstract text in the text portion of the patent document and insert the element numbers into Abstract text and then overwriting the image file of the cover page with the text of the Abstract text with numbers.

4. Interactive Patent Figures

It is preferable to make the image files for the patent figures "interactive" wherein if the user passes over or selects an element name/number that the corresponding sentence(s)/paragraph(s) containing the element name/number are displayed in a pop-up or other convenient manner. The element numbers/names may be comprised of a hyperlink or other active item that allows for selection of the same. For example, in the '429 patent described above, if the user selects (e.g. right-clicks) upon element number 24 in FIG. 3, the following text would be displayed to conveniently and immediately show the user what the patent document says about that particular element number (see FIG. 21 also):

\* \* \* \* \*

Chalk holder 12 also comprises at least one, and preferably at least two, slots 24 disposed along a portion of the longitudinal axis of the chalk holder for accepting ramps 16 in sliding engagement.

\*\*\*\*\*\*\*\*\*\*\*\*\*\*\*\*\*\*\*\*\*\*

Moreover, it will be apparent to those of ordinary skill in the art that the slots 24 and ramps 16 may be configured so as to provide a lock against pressing the chalk holder axially within the outer holder to release the chalk.

\*\*\*\*\*\*\*\*\*\*\*\*\*\*\*\*\*\*\*\*\*\*

In addition, if the user selects the figure number itself, all locations in the patent document that discuss the selected figure number will be displayed in a pop-up. For example, if "FIG. 3" was selected all sentences or paragraphs(s) would be shown that contain reference to "FIG. 3" to show the user the discussion regarding that particular figure.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A method of analyzing a patent document, said method comprising:
   providing a patent document, wherein said patent document includes text data;
   providing element name data for said patent document comprising a plurality of element names in said text data of said patent document and a plurality of element numbers associated with said plurality of element names, wherein said step of providing element name data comprises:
      providing a non-element database;
      identifying a first element number within said text data; and
      identifying a preceding identifier to the left of said first element number, wherein said preceding identifier is within said non-element database, wherein said first element name is comprised of one or more words between said first element number and said preceding identifier;
   displaying said plurality of element names in a first display area;
   selecting a first identifier associated with said first element name from said plurality of element names displayed in said first display area; and
   displaying on a first display a corresponding text portion of said text data that includes said first element name and said first element number, wherein said corresponding text portion is comprised of at least one sentence that includes said first element name, and wherein said corresponding text portion is displayed in a second display area separate from said first display area.

2. The method of analyzing a patent document of claim 1, including the step of selecting a second identifier associated with a second element name from said plurality of names, wherein said corresponding text portion is comprised of text data that includes both said first element name and said second element name.

3. The method of analyzing a patent document of claim 1, wherein said corresponding text portion is comprised of at least one paragraph that includes said first element name.

4. A method of analyzing a patent document, said method comprising:
   providing a patent document, wherein said patent document includes text data and image data comprised of a figure;
   providing element name data for said patent document comprising a plurality of element names and a plurality of element numbers associated with said plurality of element names in said text data of said patent document, wherein said step of providing element name data comprises:
      providing a non-element database;
      identifying a first element number within said text data; and
      identifying a preceding identifier to the left of said first element number, wherein said preceding identifier is within said non-element database, wherein said first element name is comprised of one or more words between said first element number and said preceding identifier;
   selecting a first identifier on said figure associated with a first element name from said plurality of element names, wherein said plurality of element numbers includes a first element number associated with said first element name; and
   displaying on a first display a corresponding text portion of said text data on said figure that includes said first element name and said first element number, wherein said corresponding text portion is comprised of at least one sentence that includes said first element name and said first element number, and wherein said corresponding text portion is displayed in a second display area separate from said first display area.

5. The method of analyzing a patent document of claim 1, including the step of displaying a separator when said corresponding text portion is comprised of a plurality of sentences, wherein said separator is positioned between two of said plurality of sentences.

6. The method of analyzing a patent document of claim 5, wherein said separator is horizontally aligned.

7. The method of analyzing a patent document of claim 1, including the step of emphasizing said first element name within said corresponding text portion.

8. The method of analyzing a patent document of claim 7, wherein said step of emphasizing said first element name is comprised of highlighting said first element name in a first color.

9. The method of analyzing a patent document of claim 7, including the step of emphasizing said first element number associated with said first element name.

10. A method of displaying one or more sentences of a patent document that include a first element name, said method comprising:
    providing a patent document, wherein said patent document includes text data;
    identifying a first element number within said text data;
    identifying a first element name within said text data associated with said first element number, wherein said step of identifying a first element name comprises:
       providing a non-element database;
       identifying a plurality of first words to the left of said first element number within said text data; and
       identifying a preceding identifier within said plurality of first words, wherein said preceding identifier is within said non-element database, wherein said first element name is comprised of one or more words between said first element number and said preceding identifier; and displaying a corresponding text portion of said text data that includes said first element name, wherein said corresponding text portion is comprised of at least one sentence that includes said first element name and said first element number;

wherein said text data includes a plurality of element numbers associated with a plurality of element names, wherein said plurality of element numbers includes said first element number associated with said first element name.

11. The method of claim 10, wherein said corresponding text portion includes both said first element name and said first element number.

12. The method of claim 10, including the steps of:

identifying a second element number within said text data;

identifying a second element name within said text data associated with said second element number; and displaying a corresponding text portion of said text data that includes said first element name and said second element name, wherein said corresponding text portion is comprised of at least one sentence that includes said first element name and said second element name.

13. The method of claim 10, wherein said step of identifying a first element name comprises:

providing said non-element database comprised of proper nouns, verbs, punctuation marks, symbols and/or months;

identifying at least one word to the left of said first element number within said text data;

determining if a first word to the left of said first element number is a non-element word included in said non-element database; and identifying said first word as part of said first element name if said first word is not within said non-element database.

14. The method of claim 10, wherein said non-element database is comprised of articles.

15. The method of claim 14, wherein said articles in said non-element database are comprised of the following words:

(a) the; and (b) to.

16. The method of claim 10, wherein said non-element database is comprised of articles, prepositions, conjunctions, verbs, adverbs, contractions, symbols, punctuation marks, and/or relative adjectives.

17. The method of claim 10, wherein said non-element database is comprised of articles, prepositions, conjunctions, verbs, adverbs, contractions, expletives, symbols, punctuation marks, and relative adjectives.

18. A method of displaying one or more sentences of a patent document that include a first element name, said method comprising:

providing a patent document, wherein said patent document includes text data;

identifying a first element number within said text data;

identifying a first element name within said text data associated with said first element number, wherein said step of identifying a first element name comprises:

providing a non-element database;

identifying at least one word to the left of said first element number within said text data;

determining if a first word to the left of said first element number is a non-element word included in said non-element database;

identifying said first word as part of said first element name if said first word is not within said non-element database; and identifying a preceding identifier to the left of said first element number, wherein said preceding identifier is within said non-element database, wherein said first element name is comprised of one or more words between said preceding identifier and said first element number; and displaying a corresponding text portion of said text data that includes said first element name, wherein said corresponding text portion is comprised of at least one sentence that includes said first element name and said first element number;

wherein said text data includes a plurality of element numbers associated with a plurality of element names, wherein said plurality of element numbers includes said first element number associated with said first element name.

19. The method of claim 18, wherein said corresponding text portion includes both said first element name and said first element number.

20. The method of claim 18, wherein said non-element database is comprised of proper nouns, verbs, punctuation marks, symbols and/or months.

\* \* \* \* \*